(12) United States Patent  
Imamura et al.

(10) Patent No.: US 7,749,131 B2  
(45) Date of Patent: Jul. 6, 2010

(54) VEHICULAR DRIVE SYSTEM AND CONTROL METHOD

(75) Inventors: Tatsuya Imamura, Toyota (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 12/073,961

(22) Filed: Mar. 12, 2008

(65) Prior Publication Data

US 2008/0227591 A1 Sep. 18, 2008

(30) Foreign Application Priority Data

Mar. 15, 2007 (JP) ............................. 2007-066507

(51) Int. Cl.
*B60K 1/02* (2006.01)

(52) U.S. Cl. ......................................................... 477/3

(58) Field of Classification Search ....................... 475/5
See application file for complete search history.

(56) References Cited

U.S. PATENT DOCUMENTS

| | | | |
|---|---|---|---|
| 7,249,642 B2* | 7/2007 | Tabata et al. ........... | 180/65.275 |
| 7,318,787 B2* | 1/2008 | Tabata et al. .................... | 477/3 |
| 7,426,972 B2* | 9/2008 | Tabata et al. ............. | 180/65.22 |
| 7,481,737 B2* | 1/2009 | Tabata et al. .................... | 477/3 |
| 7,503,870 B2* | 3/2009 | Tabata et al. .................... | 477/3 |
| 7,566,288 B2* | 7/2009 | Tabata et al. .................... | 477/4 |
| 2006/0027413 A1* | 2/2006 | Tabata et al. ............. | 180/305 |
| 2009/0036263 A1* | 2/2009 | Iwase et al. .................... | 477/3 |
| 2009/0037061 A1* | 2/2009 | Tabata et al. .................. | 701/55 |
| 2009/0227407 A1* | 9/2009 | Kamada et al. ................ | 475/5 |
| 2010/0041511 A1* | 2/2010 | Tabata et al. .................... | 477/3 |

FOREIGN PATENT DOCUMENTS

| | | |
|---|---|---|
| JP | A 2002-139136 | 5/2002 |
| JP | A 2005-186736 | 7/2005 |
| JP | A 2005-264762 | 9/2005 |

* cited by examiner

*Primary Examiner*—Dirk Wright  
(74) *Attorney, Agent, or Firm*—Oliff & Berridge, PLC

(57) ABSTRACT

A vehicular drive system includes a standby control apparatus which controls a switch to standby control based on a switching line graph that has a standby region that places a differential state switching device in a state just before it starts to apply. This standby region is located between a differential region and a locked region on the switching line graph. Accordingly, when the differential state switching device enters the standby region from the differential region, it is placed in a state just before it starts to apply. As a result, the differential state switching device is quickly able to have the necessary torque capacity when the engine torque is increased, which suppresses a decrease in the durability of the differential state switching device.

25 Claims, 10 Drawing Sheets

FIG. 2

| | C0 | C1 | C2 | B0 | B1 | B2 | B3 | GEAR RATIO | STEP |
|---|---|---|---|---|---|---|---|---|---|
| 1st | ◎ | ○ | | | | | ○ | 3.357 | |
| | | | | | | | | | 1.54 |
| 2nd | ◎ | ○ | | | | ○ | | 2.180 | |
| | | | | | | | | | 1.53 |
| 3rd | ◎ | ○ | | | ○ | | | 1.424 | |
| | | | | | | | | | 1.42 |
| 4th | ◎ | ○ | ○ | | | | | 1.000 | |
| | | | | | | | | | 1.42 |
| 5th | | ○ | ○ | ◎ | | | | 0.705 | |
| R | | | ○ | | | | ○ | 3.209 | TOTAL |
| N | | | | | | | | | 4.76 |

○ APPLIED

◎ APPLIED WHEN STEPPED, RELEASED WHEN CONTINUOUSLY VARIABLE

VEHICULAR DRIVE SYSTEM AND CONTROL METHOD

INCORPORATION BY REFERENCE

The disclosure of Japanese Patent Application No. 2007-066507 filed on Mar. 15, 2007, including the specification, drawings and abstract is incorporated herein by reference in its entirety.

BACKGROUND OF THE INVENTION

1. Field of the Invention

The invention relates to a vehicular drive system provided with i) an electric differential portion in which a differential state is controlled by an electric motor, and ii) a differential state switching device which switches that electric differential portion between a differential state and a non-differential state. The invention also relates to a control method of that vehicular drive system. More particularly, the invention relates to suppressing a decrease in durability of the differential state switching device.

2. Description of the Related Art

Japanese Patent Application Publication No. 2005-264762 (JP-A-2005-264762) describes a control apparatus for a vehicular drive system that is includes an engine, an electric differential portion, and a differential state switching device. In the electric differential portion, the differential state of the rotation speed of an input shaft that is connected to the engine and the rotation speed of an output shaft is controlled by controlling the operating state of an electric motor that is connected to a rotation element of a differential mechanism is such a manner that power can be transmitted thereto. The differential state switching device is formed of an apply element for selectively switching the differential mechanism between a differential state in which differential operation is possible and a locked state in which differential operation is not possible. When starting the engine, the technology described in JP-A-2005-264762 quickly increases the engine speed to a speed at which ignition is possible by appropriately controlling a first electric motor and a second electric motor that are connected to the electric differential portion.

With the vehicular drive system in JP-A-2005-264762, the differential mechanism is switched from a differential state in which electric continuously variable differential operation is possible to a non-differential state (i.e., a locked state) in which that electric continuously variable differential operation is not possible, by applying a switching clutch or a switching brake which is an apply device provided in the differential mechanism. Here, if the actuation response of a switching clutch or switching brake to a change in the input to the differential mechanism, e.g., engine output, is low, torque ends up being rapidly input to that switching clutch or switching brake when it is applied. As a result, the switching clutch or switching brake may slip which may reduce the durability of these apply devices.

SUMMARY OF THE INVENTION

This invention thus provides a vehicular drive system that includes i) an electric differential portion in which a differential state is controlled by an electric motor, and ii) a differential state switching device which switches that electric differential portion between a differential state and a non-differential state, as well as a control method of that vehicular drive system, which suppresses a decrease in durability of the differential state switching device.

A first aspect of the invention relates to a vehicular drive system that includes an engine; an electric differential portion in which a differential state of i) a rotation speed of an input shaft of the electric differential portion which is connected to the engine and ii) a rotation speed of an output shaft of the electric differential portion is controlled by controlling an operating state of an electric motor that is connected to a rotating element of a differential mechanism in a manner such that power can be transmitted to the differential mechanism; and a differential state switching device formed of an apply element for selectively switching the differential mechanism between a differential state in which differential operation is possible and a locked state in which differential operation is not possible. The vehicular drive system also includes a differential state switch controlling apparatus which switches the differential state based on a switching line graph which is set in advance according to a running state of the vehicle and demarcates a differential region in which the differential operation of the differential mechanism is possible and a locked region in which the differential operation of the differential mechanism is not possible; and a standby control apparatus which controls a switch to standby control between the differential state and the locked state based on a switching line graph that has a standby region between the differential region and the locked region, which places the differential state switching device in a state just before the differential state switching device starts to apply.

This vehicular drive system is provided with the standby control apparatus so when the state of the vehicle moves from the differential region into the standby region, the differential state switching device is placed in a state just before it starts to apply. By placing the differential state switching device in a state just before it starts to apply in the standby region, the differential state switching device can be quickly switched to the locked state when the state of the vehicle state enters the locked region. As a result, the differential state switching device is able to quickly have the necessary torque capacity when the engine torque is increased so slipping that occurs at the differential state switching device can be suppressed. As a result, a decrease in the durability of the differential state switching device can be suppressed.

The standby control apparatus may switch to standby control based on a response of the differential state switching device.

Accordingly, when the response of the differential state switching device is low, for example, standby control can be executed thus suppressing a decrease in the response of the differential state switching device.

The standby control apparatus may expand the standby region on the switching line graph toward the differential region side according to the response of the differential state switching device.

According to this vehicular drive system, the standby region can be enlarged or expanded when the response of the differential state switching device is particularly low, for example. As a result, even when the response of the differential state switching device is especially low, the period of time for which the differential state switching device is kept in the state just before it starts to apply can be increased, thereby suppressing a decrease in the response of the differential state switching device.

The response of the differential state switching device may be determined based on a hydraulic fluid temperature of a shifting portion.

Typically, as the hydraulic fluid temperature of the shifting portion drops, the viscosity of that hydraulic fluid increases, and as a result, the response of the differential state switching device that is operated by that hydraulic fluid decreases. Therefore, the response of the differential state switching device can be indirectly determined based on the hydraulic fluid temperature of the shifting portion and is therefore relatively easy to determine.

The standby control apparatus may switch to standby control based on the response to input torque that is input to the electric differential portion.

According to this vehicular drive system, when the response to the input torque that is input to the electric differential portion is low, for example, the differential state switching device is placed in the state just before it starts to apply which also makes it possible to deal with unstable input torque quickly.

The standby control apparatus may switch to standby control based on an amount of change in the torque of the engine that is input to the electric differential portion.

According to this vehicular drive apparatus, by placing the differential state switching device in the state just before it starts apply in the standby region, the differential state switching device can quickly be placed in the locked state even when the engine torque increases suddenly, for example. As a result, a decrease in the durability of the differential state switching device can be suppressed.

The standby control apparatus may switch to standby control based on reaction torque of the electric motor.

According to this vehicular drive apparatus, the engine torque can be estimated indirectly from the reaction torque of the electric motor so it is possible to switch to standby control based on the reaction torque of the electric motor.

The standby control apparatus may switch to standby control based on an amount of change in speed of the engine.

According to this vehicular drive apparatus, by placing the differential state switching device in the state just before it starts apply in the standby region, the differential state switching device can quickly be placed in the locked state even when the engine torque increases suddenly, for example. As a result, a decrease in the durability of the differential state switching device can be suppressed.

The differential state switching apparatus may switch the differential mechanism to a locked state when the vehicle is running at a high speed such as a vehicle speed that exceeds a high speed running determining value, which is set in advance, for determining when the vehicle is running at a high speed, and/or when the vehicle is running at a high output such as an output that exceeds a high output running determining value, which is set in advance, for determining when the vehicle is running at a high output.

According to this vehicular drive apparatus, when running at a high speed in which the actual vehicle speed exceeds a high speed running determining value, and/or when running at a high output in which a value related to the driving force, e.g., the required driving force or the actual driving force, exceeds a high output running determining value, output from the engine is transmitted to the driving wheels entirely along a mechanical power transmitting path so conversion loss between power and electric energy that occurs when the electric differential portion is made to operate as a transmission in which the gear ratio is changed electrically is suppressed so fuel efficiency is improved.

The electric differential portion may operate as a continuously variable transmission by the operating state of the electric motor being controlled.

According to this vehicular drive apparatus, the differential portion and the automatic shifting portion together make up a continuously variable transmission so the drive torque can be changed smoothly. Incidentally, the electric differential portion is not only able to operate as an electric continuously variable transmission by continuously changing gear ratios, but also as a stepped transmission by changing gear ratios in a stepped manner, so drive torque can also be obtained quickly by changing the total gear ratio of the vehicular drive system in a stepped manner.

The shifting portion may be a stepped automatic transmission.

According to this vehicular drive apparatus, the electric differential portion that is made to function as an electric continuously variable transmission, for example, and the stepped automatic shifting portion together make up a continuously variable transmission. Accordingly, the drive torque can be changed smoothly. In addition, when the electric differential portion is controlled so that its gear ratio is constant, a state is established by the electric differential portion and the automatic shifting portion that is similar to that of a stepped transmission so drive torque can also be quickly obtained by changing the total gear ratio of the shift mechanism in a stepped manner.

Here, the electric differential portion may be placed in either a continuously variable shift state by having the differential state switching device place the differential mechanism in a differential state in which differential operation is possible, or a stepped shift state by having the differential state switching device place the differential mechanism in a locked state in which that differential operation is not possible. Accordingly, the continuously variable shifting portion can be switched between the continuously variable shift state and the stepped shift state.

Also, the differential mechanism may be a planetary gear set in which a first element is a carrier of that planetary gear set, a second element is a sun gear of that planetary gear set, and a third element is a ring gear of that planetary gear set. This reduces the dimensions of the differential mechanism in the axial direction. Also, the differential mechanism is able to have a simple structure because it is formed of one planetary gear set.

Also, the planetary gear set may be a single pinion type planetary gear set. This reduces the dimensions of the differential mechanism in the axial direction. Also, the differential mechanism is able to have a simple structure because it is formed of one single pinion type planetary gear set.

Further, the differential state switching control apparatus may switch the electric differential portion to the stepped shift state when the vehicle is running at high speed, such as a vehicle speed that exceeds a preset high speed running determining value for determining when the vehicle is running at high speed. Accordingly, when the vehicle is running at a high speed in which the actual vehicle speed exceeds the high speed running determining value, output from the engine is transmitted to the driving wheels entirely along a mechanical power transmitting path so conversion loss between power and electric energy that occurs when the electric differential portion is made to operate as a transmission in which the gear ratio is changed electrically is suppressed so fuel efficiency is improved.

Also, the differential state switching control apparatus may switch the electric differential portion to the stepped shift state when the vehicle is running at high output, such as an output that exceeds a preset high output running determining value for determining when the vehicle is running at high output. Accordingly, when the vehicle is running at a high output in which a value related to the driving force, e.g., the required driving force or the actual driving force, exceeds the high output running determining value, the region in which output from the engine is transmitted to the driving wheels entirely along a mechanical power transmitting path and the electric differential portion is made to operate as a transmission in which the gear ratio is changed electrically is the low to medium speed running region and the low to medium output running region. Therefore, the maximum value of the electric energy to be generated by the electric motor, i.e., the maximum value of the electric energy that the electric motor transmits, can be reduced which enables the electric motor or the vehicle drive system that includes that electric motor to he further reduced in size. Also, the value related to the driving force is either directly or indirectly related to the driving force of the vehicle, such as the rotating force or transfer torque in the power transmitting path such as the output torque of the engine, the output torque of the transmission, or the driving torque or the driving wheels, or the throttle valve opening amount to obtain that rotating force or transfer torque.

Also, the total gear ratio of the vehicle drive system may be created based on the gear ratio of the shifting portion and the gear ratio of the electric differential portion. Accordingly, driving force can be obtained over a wide range using the gear ratio of the shifting portion.

A second aspect of the invention relates to a vehicular drive system that includes an engine; an electric differential portion in which a differential state of i) a rotation speed of an input shaft of the electric differential portion that is connected to the engine and ii) a rotation speed of an output shaft of the electric differential portion is controlled by controlling an operating state of an electric motor that is connected to a rotating element of a differential mechanism in a manner such that power can be transmitted to the differential mechanism; and a differential state switching device formed of an apply element for selectively switching the differential mechanism between a differential state in which differential operation is possible and a locked state in which differential operation is not possible. The vehicular drive system also includes a controller which controls the differential state switching device based on a switching line graph which is set in advance according to a running state of the vehicle and has i) a differential region in which the differential operation of the differential mechanism is possible, ii) a locked region in which the differential operation of the differential mechanism is not possible, iii) and a standby region which is between the differential region and the locked region and which places the differential state switching device in a state just before the differential state switching device starts to apply.

A third aspect of the invention relates to a control method for a vehicular drive system, which includes the steps of determining a running state of the vehicle; and placing a differential state switching device, which switches between i) a differential state in which differential operation is possible between a rotation speed of an input shaft of a differential mechanism that is provided between an engine and a transmission, the input shaft being connected to the engine, and a rotation speed of an output shaft of the differential mechanism, and ii) a non-differential state in which differential operation is not possible between the rotation speed of the input shaft and the rotation speed of the output shaft, by controlling an operating state of an electric motor that is connected to a rotating element of the differential mechanism in a manner such that power can be transmitted to that rotating element, in a state immediately preceding the differential state based on the determined running state of the vehicle.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 2 is a clutch and brake application chart showing the relationship between shift operations when the hybrid vehicle drive system according to the example embodiment shown in FIG. 1 is made to shift gears in a continuously variable manner or a stepped manner, and the combinations of hydraulic friction apply devices used in those shift operations;

DETAILED DESCRIPTION OF THE EMBODIMENTS

Figure 1:
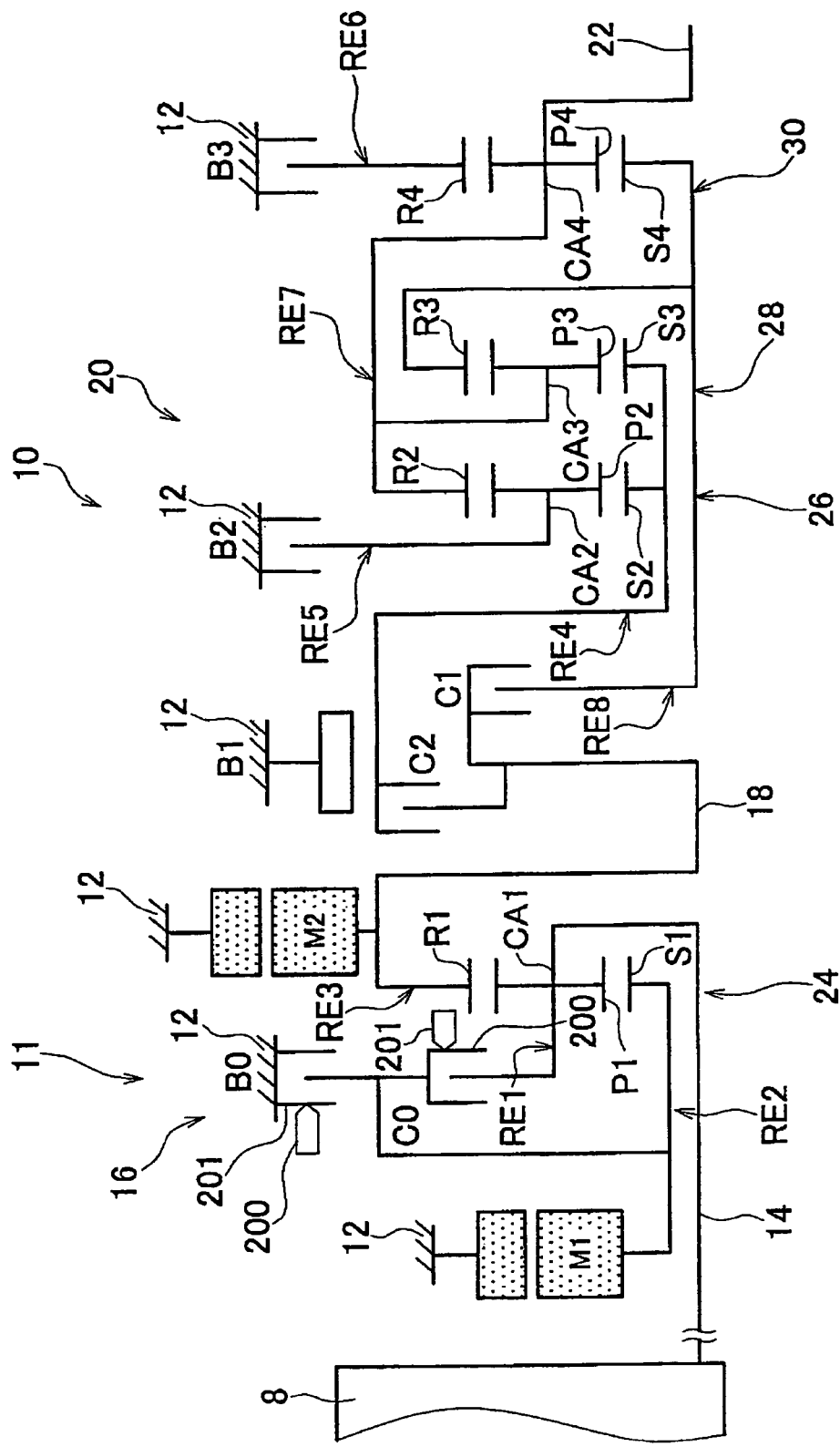
FIG. 1 is a skeleton view of the structure of a hybrid vehicle drive system according to one example embodiment of the invention.

FIG. 1 is a skeleton view of shift mechanism 10 that constitutes part of a drive system of a hybrid vehicle according to one example embodiment of the invention. In FIG. 1, the shift mechanism 10 includes, in series, an input shaft 14, a differential portion 11, an automatic shifting portion 20, and an output shaft 22, all of which are arranged on a common axis inside a transmission case 12 (hereinafter simply referred to as "case 12") which is a non-rotating member that is attached to the vehicle body. The input shaft 14 serves as an input rotating member. The differential portion 11 is either directly connected to the input shaft 14 or connected to the input shaft 14 via a pulsation absorbing damper (i.e., a pulsation damping device), not shown. The automatic shifting portion 20 is a shifting portion that functions as a stepped transmission and which is connected in series via a transmitting member (i.e., a transmitting shaft) 18 in a power transmitting path between the differential portion 11 and driving wheels 38. The output shaft 22 is an output rotating member that is connected to the automatic shifting portion 20. The shift mechanism 10 is preferably used in a FR (front-engine, rear-drive) type vehicle in which it is longitudinal mounted in the vehicle, for example. The shift mechanism 10 is provided between the pair of driving wheels 38 and an engine 8 which is an internal combustion engine such as a gasoline engine or a diesel engine, for example, that serves as a driving power source for running which is either directly connected to the input shaft 14 or connected to the input shaft 14 via a pulsation absorbing damper, not shown (see FIG. 6). This shift mechanism 10 transmits power from the engine 8 to the pair of driving wheels 38 via a differential gear unit (final reduction device) 36 and a pair of axles and the like, in that order, which make up part of the power transmitting path.

In this way, in the shift mechanism 10 of this example embodiment, the engine 8 and the differential portion 11 are directly connected. The term "directly connected" here means that they are connected without a fluid power transmitting device such as a torque converter or a fluid coupling provided between them, although they may be connected via the pulsation absorbing damper or the like, for example, and still be considered as being directly connected. Incidentally, the shift mechanism 10 has a symmetrical structure with respect to its axis so the lower side is omitted in the skeleton view in FIG. 1. This is also true for each of the following example embodiments.

The differential portion 11 includes a first electric motor M1, a power split device 16, and a second electric motor M2. The power split device 16 is a mechanical differential mechanism which mechanically distributes power that was input to the input shaft 14 from the engine 8 to the first electric motor M1 and the transmitting member 18. The second electric motor M2 is provided so that it rotates together with the transmitting member 18. Incidentally, the second electric motor M2 may be provided at any portion in the power transmitting path between the transmitting member 18 and the driving wheels 38. The first electric motor M1 and the second electric motor M2 in this example embodiment are both so-called motor-generators that can also function as generators. The first electric motor M1 is at least able to function as a generator (i.e., is capable of generating power) for generating reaction force, and the second generator M2 is at least able to function as a motor (i.e., an electric motor) that outputs driving force as a driving power source for running.

The power split device 16 has as its main components a single pinion type first planetary gear set 24 having a predetermined gear ratio $\rho 1$ of approximately 0.418, for example, a switching clutch C0, and a switching brake B0. This first planetary gear set 24 has as rotating elements (i.e., elements) a first sun gear S1, first pinion gears P1, a first carrier CA1 which rotatably and revolvably supports the first pinion gears P1, and a first ring gear R1 that is in mesh with the first sun gear S1 via the first pinion gears P1. When the number of teeth on the first sun gear S1 is ZS1 and the number of teeth on the first ring gear R1 is ZR1, the gear ratio $\rho 1$ is ZS1/ZR1.

In this power split device 16, the first carrier CA1 is connected to the input shaft 14, i.e., the engine 8, the first sun gear S1 is connected to the first electric motor M1, and the first ring gear R1 is connected to the transmitting member 18. Also, the switching brake B0 is provided between the first sun gear S1 and the case 12, and the switching clutch C0 is provided between the first sun gear S1 and the first carrier CA1. Releasing both the switching clutch C0 and the switching brake B0 enables the first sun gear S1, the first carrier CA1, and the first ring gear R1 to rotate relative one another, thus placing the power split device 16 in a differential state in which differential operation is possible. Therefore, the output from the engine 8 can be distributed to the first electric motor M1 and the transmitting member 18, with some of the output from the engine 8 that was distributed being used to run the first electric motor M1 to generate electric energy to be stored, and some used to run the second electric motor M2 to provide driving force. Accordingly, the differential portion 11 (i.e., the power split device 16) functions as an electric differential device. For example, the differential portion 11 may be placed in a so called continuously variable shift state (i.e., an electric CVT state) and the rotation speed of the transmitting member 18 can be continuously (i.e., in a stepless manner) changed regardless of the predetermined speed of the engine 8. That is, when the power split device 16 is placed in the differential state, the differential portion 11 is also placed in a differential state. Accordingly, the differential portion 11 is placed in the continuously variable shift state in which it functions as an electric continuously variable transmission in which its gear ratio $\gamma 0$ (the rotation speed of the input shaft 14 divided by the rotation speed of the transmitting member 18) can be continuously (i.e., in a stepless manner) changed from a minimum value $\gamma 0$min to a maximum value $\gamma 0$max. In this way, the differential state of the rotation speed of the input shaft 14 that is connected to the engine 8 and the rotation speed of the transmitting member 18 that serves as the output shaft is controlled by the first electric motor M1 and the second electric motor M2. Incidentally, the switching clutch C0 and the switching brake B0 in this example embodiment may be regarded as differential state switching devices of the invention. Hereinafter when the switching device (i.e., the switching clutch C0 or the switching brake B0) is not specified, it will simply be referred to as "differential state switching device (C0, B0)".

In this state, when the switching clutch C0 or the switching brake B0 is applied, the power split device 16 changes to a non-differential state (i.e., a locked state) in which the foregoing differential operation is not possible. More specifically, when the switching clutch C0 is applied such that the first sun gear S1 and the first carrier CA1 are integrally connected together, the three elements of the planetary gear set 24, i.e., the first sun gear S1, the first carrier CA1, and the first ring gear R1, are made to rotate together, i.e., rotate integrally by being locked together, placing the power split device 16 in a non-differential state in which the differential operation is not possible. As a result, the differential portion 11 is also placed in a non-differential state. Also, the rotation speed of the engine 8 matches the rotation speed of the transmitting member 18 so the differential portion 11 (i.e., the power split device 16) is placed in a fixed shift state, i.e., a stepped shift state, in which it functions as a transmission in which the gear ratio $\gamma 0$ is fixed at 1. Then when the switching brake B0 is applied instead of the switching clutch C0 such that the first sun gear S1 is locked to the case 12, the first sun gear S1 is locked against rotation, i.e., is unable to rotate, placing the power split device 16 in a non-differential state in which the differential operation is not possible. As a result, the differential 11 is also placed in a non-differential state. Also, the first ring gear R1 rotates faster than the first carrier CA1 so the power split device 16 functions as a speed increasing transmission, and the differential portion 11 (i.e., the power split device 16) is placed in a fixed shift state, i.e., stepped shift state, in which it functions as a speed increasing transmission in which the gear ratio γ0 is fixed at a value less than 1, such as approximately 0.7, for example.

In this way, the switching clutch C0 and the switching brake B0 in this example embodiment function as differential state switching devices that selectively switch the shift state of the differential portion 11 (i.e., the power split device 16) between a differential state, i.e., an unlocked state, and a non-differential state, i.e., a locked state. That is, the switching clutch C0 and the switching brake B0 function as differential state switching devices that selectively switch the shift state of the differential portion 11 (i.e., the power split device 16) between i) a differential state in which differential operation is made possible by the differential portion 11 (i.e., the power split device 16) operating as an electric differential device, for example, a continuously variable shift state in which an electric continuously variable shift operation is made possible by the differential portion 11 (i.e., the power split device 16) operating as a continuously variable transmission in which the gear ratio can be changed continuously (i.e., in s stepless manner), and ii) a fixed shift state (i.e., a non-differential state) in which the gear ratio is locked so that it will not change (i.e., fixed at a constant gear ratio) by the differential portion 11 (i.e., the power split device 16) operating as a single-speed or multiple-speed transmission having one or two or more gear ratios, i.e., a fixed shift state in which the differential portion 11 (i.e., the power split device 16) operates as a single-speed or multiple-speed transmission in which the gear ratio is constant.

The automatic shifting portion 20 makes up part of the power transmitting path from the differential portion 11 to the driving wheels 38 and includes a single pinion type second planetary gear set 26, a single pinion type third planetary gear set 28, and a single pinion type fourth planetary gear set 30. The second planetary gear set 26 includes a second sun gear S2, second pinion gears P2, a second carrier CA2 which rotatably and revolvably supports the second pinion gears P2, and a second ring gear R2 that is in mesh with the second sun gear S2 via the second pinion gears P2, and has a predetermined gear ratio ρ2 of approximately 0.562, for example. The third planetary gear set 28 includes a third sun gear S3, third pinion gears P3, a third carrier CA3 which rotatably and revolvably supports the third pinion gears P3, and a third ring gear R3 that is in mesh with the third sun gear S3 via the third pinion gears P3, and has a predetermined gear ratio ρ3 of approximately 0.425, for example. The fourth planetary gear set 30 includes a fourth sun gear S4, fourth pinion gears P4, a fourth carrier CA4 which rotatably and revolvably supports the fourth pinion gears P4, and a fourth ring gear R4 that is in mesh with the fourth sun gear S4 via the fourth pinion gears P4, and has a predetermined gear ratio ρ4 of approximately 0.424, for example. When the number of teeth of the second sun gear S2 is ZS2, the number of the teeth on the second ring gear R2 is ZR2, the number of teeth on the third sun gear S3 is ZS3, the number of teeth on the third ring gear R3 is ZR3, the number of teeth on the fourth sun gear S4 is ZS4, and the number of teeth on the fourth ring gear R4 is ZR4, the gear ratio ρ2 is ZS2/ZR2, the gear ratio ρ3 is ZS3/ZR3, and the gear ratio ρ4 is ZS4/ZR4.

In the automatic shifting portion 20, the second sun gear S2 and the third sun gear S3 are integrally connected together as well as selectively connected to the transmitting member 18 via the second clutch C2 and selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4 are integrally connected together as well as to the output shaft 22. The third ring gear R3 and the fourth sun gear S4 are integrally connected together as well as selectively connected to the transmitting member 18 via the first clutch C1. In this way, the automatic transmission 20 and the transmitting member 18 are selectively connected together via the first clutch C1 or the second clutch C2 which are used to establish various gears in the automatic shifting portion 20. In other words, the first clutch C1 and the second clutch C2 function as apply devices that selectively change the power transmitting path between the transmitting member 18 and the automatic shifting portion 20, i.e., between the differential portion 11 (i.e., the transmitting member 18) and the driving wheels 38, between a power transmittable state in which power is able to be transmitted along that power transmitting path and a power transmission-interrupted state in which power is not able to be transmitted (i.e., the flow of power is interrupted) along that power transmitting path. That is, applying at least one of the first clutch C1 and the second clutch C2 places the power transmitting path in the power transmittable state. Conversely, releasing both the first clutch C1 and the second clutch C2 places the power transmitting path in the power transmission-interrupted state.

The switching clutch C0, the last clutch C1, the second clutch C2, the switching brake B0, the first brake B1, the second brake B2, and the third brake B3 are hydraulic friction apply devices that are often used in conventional vehicular stepped automatic transmissions. The clutches may be wet type multiple disc clutches in which a plurality of stacked friction plates are pressed together by a hydraulic actuator, and the brakes may be a band brakes in which one end of one or two bands that are wound around the outer peripheral surface of a rotating drum is pulled tight by a hydraulic actuator. The hydraulic friction apply devices selectively connect members on either side of them.

In the shift mechanism 10 structured as described above, any gear from first gear (i.e., first speed) through fifth gear (i.e., fifth speed), reverse (i.e., reverse gear), or neutral may be selectively established by selectively applying the switching clutch C0, the first clutch C1, the second clutch C2, the switching brake B0, the first brake B1, the second brake B2, and the third brake B3 in the combinations shown in the clutch and brake application chart in FIG. 2, for example, such that a gear ratio γ (=the rotation speed $N_{IN}$ of the input shaft/the rotation speed $N_{OUT}$ of the output shaft) that changes in substantially equal ratio is obtained for each gear. In particular, in this example embodiment, the power split device 16 is provided with differential state switching devices (C0, B0), i.e., the switching clutch C0 and the switching brake B0. Applying one of these differential state switching devices (C0, B0) places the differential portion 11 in either the continuously variable shift state in which it operates as a continuously variable transmission, or a fixed shift state in which it operates as a transmission with a fixed gear ratio, depending on which of the differential state switching devices (C0, B0) is applied, as described above. Accordingly, the shift mechanism 10 can be placed in a stepped shift state, in which it operates as a stepped transmission by the automatic shifting portion 20 and the differential portion 11 that was placed in a fixed shift state by applying one of the differential state switching devices (C0, B0), or a continuously variable shift state, in which it operates as an electric continuously variable transmission by the automatic shifting portion 20 and the differential portion 11 that has been placed in the continuously variable shift state by not applying either of the differential state switching devices (C0, B0). In other words, the shift mechanism 10 can be switched to either the stepped shift state by applying one of the differential state switching devices (C0, B0), or the continuously variable shift state by not applying either of the differential state switching devices (C0, B0). Also, the differential portion 11 may also be perceived as a transmission that is able to switch between a stepped shift state and a continuously variable shift state.

For example, when the shift mechanism 10 functions as a stepped transmission, as shown in the clutch and brake application chart in FIG. 2, first gear which has the largest gear ratio γ1, e.g., approximately 3.357, can be established by applying the switching clutch C0, the first clutch C1, and the third brake B3. Second gear which has a gear ratio γ2 smaller than that of first gear, e.g., approximately 2.180, can be established by applying the switching clutch C0, the first clutch C1, and the second brake B2. Third gear which has a gear ratio γ3 smaller than that of second gear, e.g., approximately 1.424, can be established by applying the switching clutch C0, the first clutch C1, and the first brake B1. Fourth gear which has a gear ratio γ4 smaller than that of third gear, e.g., approximately 1.000, can be established by applying the switching clutch C0, the first clutch C1, and the second clutch C2. Fifth gear which has a gear ratio γ5 smaller than that of fourth gear, e.g., approximately 0.705, can be established by applying the first clutch C1, the second clutch C2, and the switching brake B0. Also, reverse (i.e., a reverse gear) which has a gear ratio γR between that of first gear and that of second gear, e.g., approximately 3.209, can be established by applying the second clutch C2 and the third brake B3. Incidentally, the automatic shifting portion 20 can be placed in neutral "N" by releasing all of the clutches and brakes.

However, when the shift mechanism functions as a continuously variable transmission, both the switching clutch C0 and the switching brake B0 are released as shown in the clutch and brake application chart in FIG. 2. As a result, the differential portion 11 functions as a continuously variable transmission and the automatic shifting portion 20 that is arranged in series with the differential portion 11 functions as a stepped transmission so the rotation speed that is input to the automatic shifting portion 20, i.e., the rotation speed of the transmitting member 18, for each of four gears, i.e., first gear, second gear, third gear, and fourth gear, of the automatic shifting portion 20 can be changed continuously such that each gear has a continuous gear ratio width. Accordingly, there is a continuously variable gear ratio between each gear, thereby enabling the total gear ratio γT of the overall shift mechanism 10 to be obtained in a continuous (i.e., stepless) manner.

Figure 3:
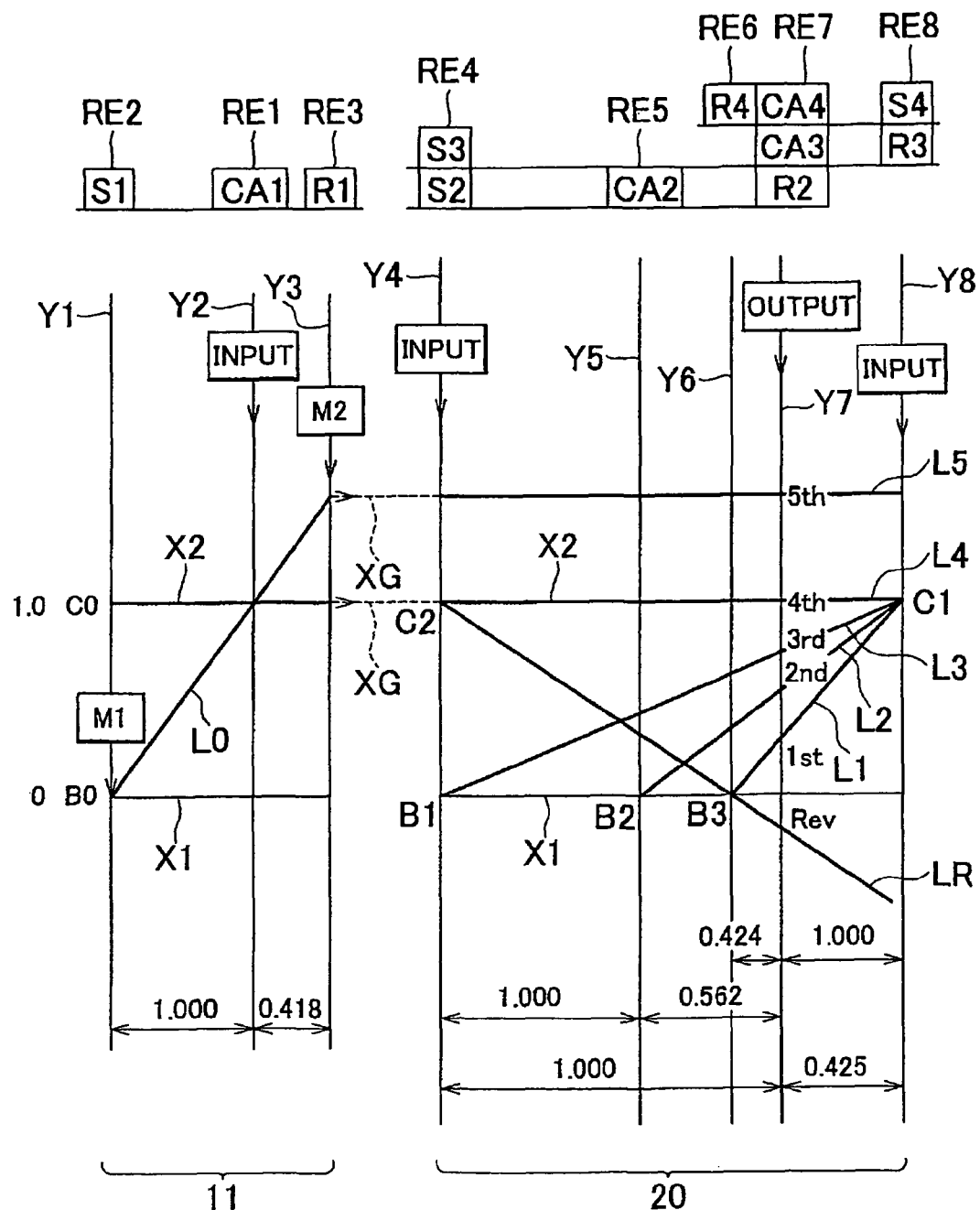
FIG. 3 is an alignment graph illustrating the relative rotation speeds in each gear when the hybrid vehicle drive system according to the example embodiment shown in FIG. 1 is made to shift gears in a stepped manner.

FIG. 3 is an alignment graph that shows, on a straight line, the correlative relationships among the rotation speeds of the various rotating members in different connective states for each gear, in the shift mechanism 10 that is made up of the differential portion 11 that functions as a continuously variable shifting portion and the automatic shifting portion 20 that functions as a stepped shifting portion. The alignment graph in FIG. 3 is a two-dimension coordinate system having horizontal axes that represent the relationship among the gear ratios ρ of the planetary gear sets 24, 26, 28, and 30, and vertical axes that represent the relative rotation speeds. The lower horizontal line X1 represents a rotation speed of zero, the upper horizontal line X2 represents a rotation speed of 1.0, i.e., the rotation speed $N_E$ of the engine 8 that is connected to the input shaft 14, and the horizontal line XG represents the rotation speed of the transmitting member 18.

Also, the three vertical lines Y1, Y2, and Y3 corresponding to the three elements of the power split device 16 that forms the differential portion 11 represent, in order from left to right, the relative rotation speeds of the first sun gear S1 corresponding to a second rotating element (second element) RE2, the first carrier CA1 corresponding to a first rotating element (first element) RE1, and the first ring gear R1 corresponding to a third rotating element (third element) RE3. The intervals between the vertical lines Y1, Y2, and Y3 are determined by the gear ratio ρ1 of the first planetary gear set 24. Further, the five vertical lines Y4, Y5, Y6, Y7, and Y8 of the automatic shifting portion 20 represent, in order from left to right, the second sun gear S2 and the third sun gear S3 which are connected together and correspond to a fourth rotating element (fourth element) RE4, the second carrier CA2 corresponding to a fifth rotating element (fifth element) RE5, the fourth ring gear R4 corresponding to a sixth rotating element (sixth element) RE6, the second ring gear R2, the third carrier CA3, and the fourth carrier CA4 which are connected together and correspond to a seventh rotating element (seventh element) RE7, and the third ring gear R3 and the fourth sun gear S4 which are connected together and correspond to an eighth rotating member (eighth element) RE8. The intervals between them are determined according to the gear ratio ρ2 of the second planetary gear set 26, the gear ratio ρ3 of the third planetary gear set 28, and the gear ratio ρ4 of the fourth planetary gear set 30. In the relationships among the spaces between the vertical axes in the alignment graph, when the space between the sun gear and the carrier is an interval corresponding to 1, the space between the carrier and the ring gear is an interval corresponding to the gear ratio ρ of the planetary gear set. That is, in the differential portion 11, the space between the vertical lines Y1 and Y2 is set to an interval corresponding to 1, and the space between vertical lines Y2 and Y3 is set to an interval corresponding to the gear ratio ρ1. Also, in the automatic shifting portion 20, the space between the sun gear and the carrier in each of the second, third, and fourth planetary gear sets 26, 28, and 30 is set to an interval corresponding to 1, and the space between the carrier and the ring gear is set to an interval corresponding to ρ.

When expressed using the alignment graph in FIG. 3, the shift mechanism 10 in this example embodiment is structured such that in the power split device 16 (i.e., the differential portion 11), the first rotating element RE1 (i.e., the first carrier CA1) of the first planetary gear set 24 is connected to the input shaft 14, i.e., the engine 8, as well as selectively connected to the second rotating element RE2 (i.e., the first sun gear S1) via the switching clutch C0, the second rotating element RE2 is connected to the first electric motor M1, as well as selectively connected to the case 12 via the switching brake B0, and the third rotating element RE3 (i.e., the first ring gear R1) is connected to the transmitting member 18 and the second electric motor M2 such that the rotation of the input shaft 14 is transmitted (input) to the automatic shifting portion (i.e., the stepped shifting portion) 20 via the transmitting member 18. The relationship between the rotation speed of the first sun gear S1 and the rotation speed of the first ring gear R1 at this time is shown by the sloped straight line L0 passing through the point of intersection of Y2 and X2.

For example, if the rotation speed of the first sun gear S1 represented by the point of intersection of the straight line L0 and the vertical line Y1 is increased or decreased by controlling the rotation speed of the first electric motor M1 when a switch is made to the continuously variable shift state (i.e., the differential state) by releasing the switching clutch C0 and the switching brake B0, then when the rotation speed of the first ring gear R1 which is restricted by the vehicle speed V is substantially constant, the rotation speed of the first carrier CA1 represented by the point of intersection of the straight line L0 and the vertical line Y2 will increase or decrease. Also, when the first sun gear S1 and the first carrier CA1 are connected together by applying the switching clutch C0, the power split device 16 is placed in a non-differential state in which the three rotating elements RE1, RE2, and RE3 rotate together. Therefore, the straight line L0 will match the horizontal line X2, and the transmitting member 18 will rotate at the same speed as the engine speed $N_E$. Alternatively, when the first sun gear S1 is held against rotation by applying the switching brake B0, the power split device 16 is placed in a non-differential state in which it is made to function as a speed increasing mechanism. Therefore, the straight line L0 becomes as shown in FIG. 3 in which the rotation speed of the first ring gear R1 represented by the point of intersection of the straight line L0 and the vertical line Y3, i.e., the rotation speed of the transmitting member 18, is input to the automatic shifting portion 20 at a speed that is faster than the engine speed $N_E$.

Also, in the automatic shifting portion 20, the fourth rotating element RE4 is selectively connected to the transmitting member 18 via the second clutch C2, as well as selectively connected to the case 12 via the first brake B1. The fifth rotating element RE5 is selectively connected to the case 12 via the second brake B2. The sixth rotating element RE6 is selectively connected to the case 12 via the third brake B3. The seventh rotating element RE7 is connected to the output shaft 22, and the eighth rotating element RE8 is selectively connected to the transmitting member 18 via the first clutch C1.

As shown in FIG. 3, in the automatic shifting portion 20, the rotation speed of the output shaft 22 in first gear, which is established by applying the first clutch C1, the third brake B3, and the switching clutch C0, is shown at the point of intersection of i) the sloped straight line L1 that passes through both the point of intersection of the horizontal line X2 and the vertical line Y8 that represents the rotation speed of the eighth rotating element RE8 and the point of intersection of the horizontal line X1 and the vertical line Y6 that represents the rotation speed of the sixth rotating element RE6, and ii) the vertical line Y7 that represents the rotation speed of the seventh rotating element RE7 that is connected to the output shaft 22. Similarly, the rotation speed of the output shaft 22 in second gear, which is established by applying the first clutch C1, the second brake B2, and the switching clutch C0, is shown at the point of intersection of the sloped straight line L2 and the vertical line Y7 that represents the rotation speed of the seventh rotating element RE7 that is connected to the output shaft 22. Also, the rotation speed of the output shaft 22 in third gear, which is established by applying the first clutch C1, the first brake B1, and the switching clutch C0, is shown at the point of intersection of the sloped straight line L3 and the vertical line Y7 that represents the rotation speed of the seventh rotating element RE7 that is connected to the output shaft 22. Similarly, the rotation speed of the output shaft 22 in fourth gear, which is established by applying the first clutch C1, the second clutch C2, and the switching clutch C0, is shown at the point of intersection of the horizontal straight line L4 and the vertical line Y7 that represents the rotation speed of the seventh rotating element RE7 that is connected to the output shaft 22. By applying the switching clutch C0 in first gear, second gear, third gear, and fourth gear, power from the differential portion 11, i.e., the power split device 16, is input to the eighth rotating element RE8 at the same speed as the engine speed $N_E$. Applying the switching brake B0 instead of the switching clutch C0, however, results in power from the differential portion 11 being input at a speed greater than the engine speed $N_E$. Therefore, the rotation speed of the output shaft 22 in fifth gear, which is established by applying the first clutch C1, the second clutch C2, and the switching brake B0, is shown at the point of intersection of the horizontal straight line L5 and the vertical line Y7 that represents the rotation speed of the seventh rotating element RE7 that is connected to the output shaft 22.

Figure 4:
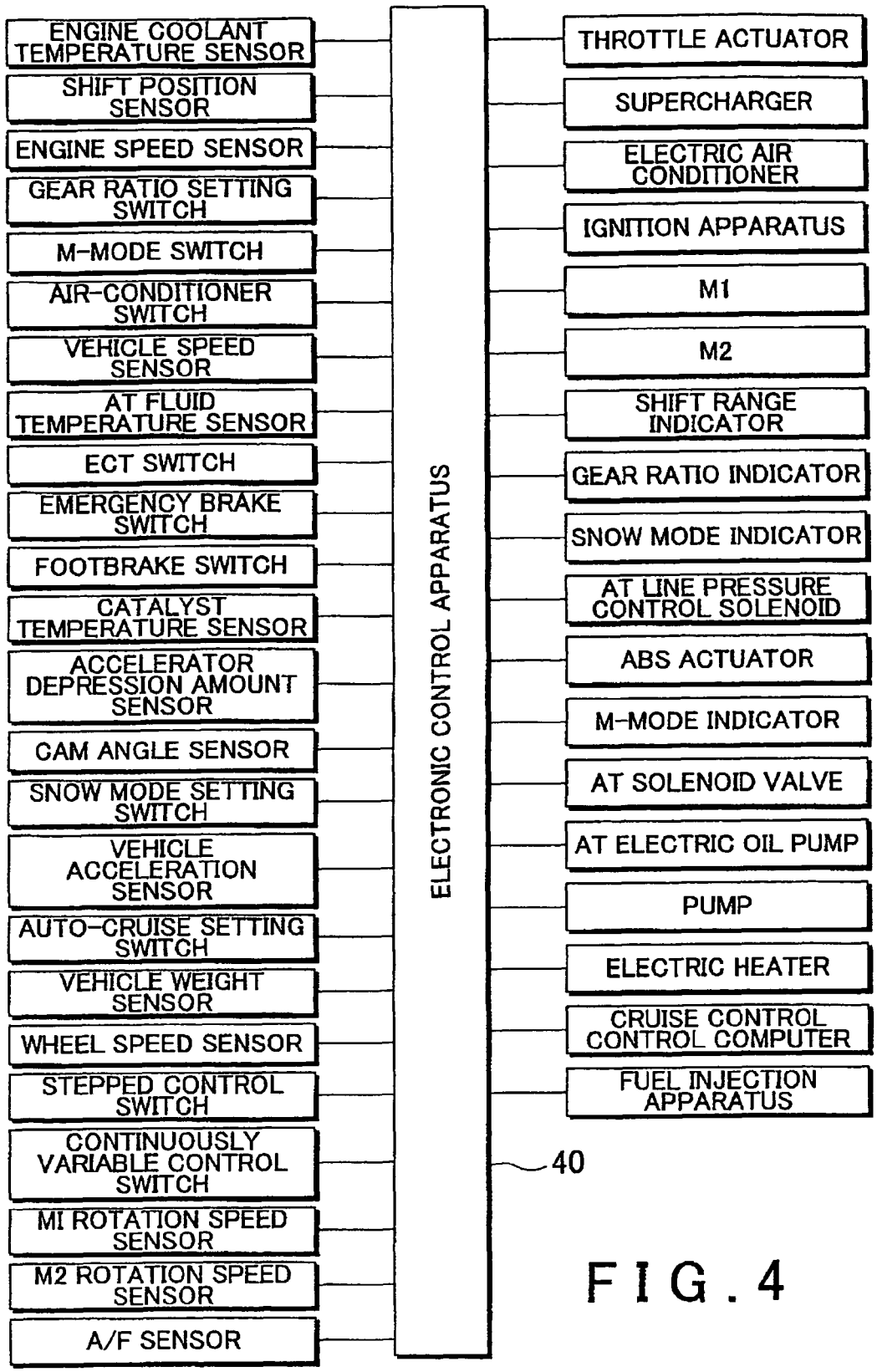
FIG. 4 is a view showing input and output signals of an electronic control apparatus provided in the drive system according to the example embodiment shown in FIG. 1.

FIG. 4 shows an example of signals input to (i.e., received by) and output from an electronic control apparatus 40 for controlling the shift mechanism 10 in this example embodiment. This electronic control apparatus 40 includes a so-called microcomputer that has a CPU, ROM, RAM, and input/output interfaces and the like. The electronic control apparatus 40 executes drive control, such as shift control of the automatic shifting portion 20 and hybrid drive control related to the engine 8 and the first and second electric motors M1 and M2, by processing the signals according to programs stored in advance in the ROM while using the temporary storage function of the RAM.

Various signals are input to this electronic control apparatus 40 from various sensors and switches and the like, as shown in FIG. 4. Among these signals are a signal indicative of the engine coolant temperature $TEMP_W$, a signal indicative of a shift position $P_{SH}$, a signal indicative of the engine speed $N_E$ which is the speed of the engine 8; a signal indicative of a gear ratio setting value, a signal indicative of a command to operate in a M-mode (manual shift running mode), a signal indicative of operation of an air-conditioner, a signal indicative of the vehicle speed V corresponding to the rotation speed $N_{OUT}$ of the output shaft 22, an AT fluid temperature signal indicative of the hydraulic fluid temperature of the automatic shifting portion 20, a signal indicative of an emergency brake operation, a signal indicative of a footbrake operation, a catalyst temperature signal indicative of the catalyst temperature, and an accelerator depression amount signal indicative of an accelerator depression amount $A_{CC}$ which corresponds to the amount of output required by the driver. Other signals received by the electronic control apparatus 40 include a can angle signal, a snow mode setting signal indicative of a snow mode setting, an acceleration signal indicative of the longitudinal acceleration of the vehicle, an auto-cruise signal indicative of auto-cruise running, a vehicle weight signal indicative of the vehicle weight, wheel speed signals indicative of the wheel speed of each wheel, a signal indicative of a stepped switch operation for switching the differential portion 11 (i.e., the power split device 16) to the stepped shift state (i.e., the locked state) to make the shift mechanism 10 function as a stepped transmission, a signal indicative of a continuously variable switch operation for switching the differential portion 11 (i.e., the power split device 16) to the continuously variable shift state (i.e., the differential state) to make the shift mechanism 10 function as a continuously variable transmission, a signal indicative of the rotation speed $N_{M1}$ of the first electric motor M1 (hereinafter simply referred to as "first electric motor rotation speed $N_{M1}$"), a signal indicative of the rotation speed $N_{M2}$ of the second electric motor M2 (hereinafter simply referred to as "second electric motor rotation speed $N_{M2}$"), and a signal indicative of the air-fuel ratio A/F of the engine 8, and the like.

The electronic control apparatus 40 also outputs various signals. Among these signals are control signals that are output to an engine output control apparatus 43 (see FIG. 5) to control engine output, such as a drive signal to a throttle actuator 97 that operates the opening amount $\theta_{TH}$ of an electronic throttle valve 96 provided in an intake passage 95 of the engine 8, a fuel supply quantity signal that controls the amount of fuel supplied into the cylinders of the engine 8 from a fuel injection apparatus 98, an ignition signal that dictates the ignition timing of the engine 8 from an ignition apparatus 99, and a pressure boost adjusting signal for adjusting the boost pressure. Other signals output from the electronic control apparatus 40 include an electric air-conditioner drive signal for operating an electric air-conditioner, command signals that direct the operation the electric motors M1 and M2, a shift position (operating position) indication signal for operating a shift indicator, a gear ratio indication signal for indicating the gear ratio, a snow mode indication signal for indicating when the vehicle is being operated in the snow mode, an ABS activation signal to activate an ABS actuator that prevents the wheels from slipping during braking, an M-mode indication signal that indicates that the M-mode has been selected, valve command signals that operate electromagnetic valves in a hydraulic pressure control circuit 42 (see FIG. 5) for controlling hydraulic actuators of the hydraulic friction apply devices in the differential portion 11 and the automatic shifting portion 20, a drive command signal for operating an electric hydraulic pump which is the source for the hydraulic pressure in the hydraulic pressure control circuit 42, a signal for driving an electric heater, and a signal that is output to a computer for controlling cruise control, and the like.

Figure 5:
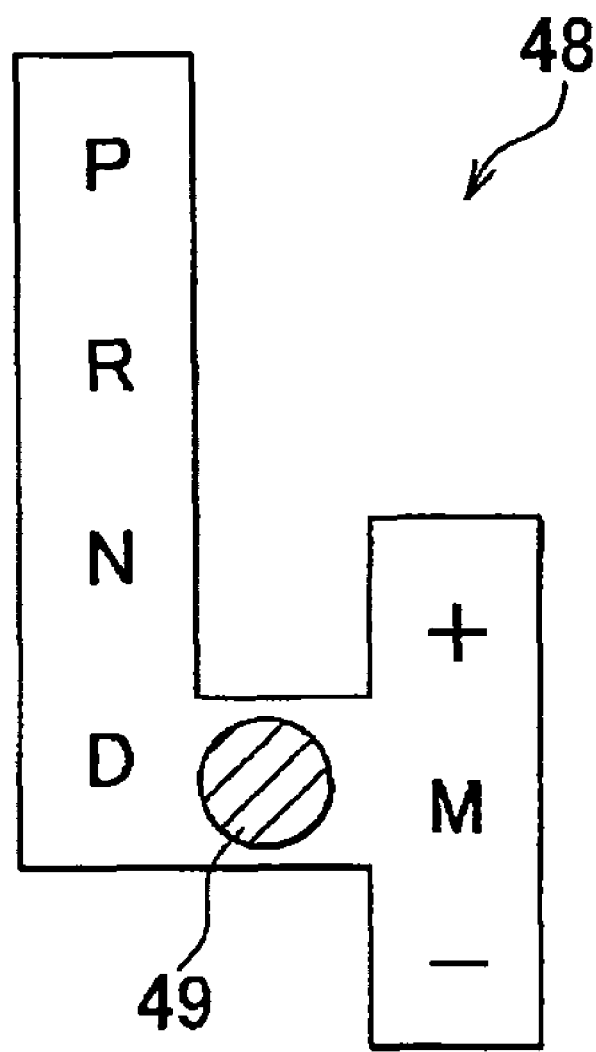
FIG. 5 is a view showing one example of a shift operation executing apparatus which serves as a switching device for manually switching between a plurality of various shift positions.

FIG. 5 shows one example of a shift operation executing device 48 that serves as switching device that is operated by a person in order to switch among a plurality of various shift positions $P_{SH}$. This shift operation executing device 48 is provided with a shift lever 49 that is arranged at the side of the driver's seat, for example, and is operated to select any one of the plurality of various shift positions $P_{SH}$.

This shift lever 49 is provided so as to be manually operated (i.e., shifted) into various positions. These positions include a park position "P", a reverse "R" position, a neutral position "N", a forward automatic shift running position (i.e., drive position) "D", and a forward manual shift running position (i.e., manual position) "M". Shifting the shift lever 49 into the park position "P" places the shift mechanism 10, i.e., the automatic shifting portion 20, in a neutral state in which the power transmitting path therein is interrupted, and locks the output shaft 22 of the automatic shifting portion 20. Shifting the shift lever 49 into the reverse position "R" enables the vehicle to run in reverse. Shifting the shift lever 49 into the neutral position "N" places the shift mechanism 10 in a neutral state in which the power transmitting path therein is interrupted. Shifting the shift lever 49 into the forward automatic shift running position (i.e., drive position) "D" establishes an automatic shift mode in which automatic shift control is executed within the range of the total gear ratio γT into which the shift mechanism 10 can be shifted that can be obtained by i) the continuous gear ratio width of the differential portion 11, and ii) the gears to which automatic shift control is applied within the range of first gear to fifth gear in the automatic shifting portion 20. Shifting the shift lever 49 into the forward manual shift running position (i.e., manual position) "M" establishes a manual shift running mode (i.e., a manual operation mode) and sets a so-called shift range that limits the highest gear (i.e., the highest gear into which the automatic shifting portion 20 can shift) in the automatic shifting portion 20.

The hydraulic control circuit 42, for example, can be electrically switched in connection with a manual operation of the shift lever 49 into a shift position $P_{SH}$ so as to establish reverse "R", neutral "N", or any forward gear in drive "D", which are shown in the clutch and brake application chart in FIG. 2.

Of the shift positions $P_{SH}$ of "P" through "M", the "P" and "N" positions are non-running positions that are selected when the vehicle is not to be run. That is, these positions are non-drive positions in which the vehicle is unable to be driven because the power transmitting path in the automatic shifting portion 20 is interrupted by the first clutch C1 and the second clutch C2 both being released, as shown in the clutch and brake application chart in FIG. 2, for example. Also, the "R", "D", and "M" positions are running positions that are selected when the vehicle is to be run. That is, these positions are drive positions in which the vehicle is able to be driven because the power transmitting path in the automatic shifting portion 20 is established by at least one of the first clutch C1 and the second clutch C2 being applied, as shown in the clutch and application chart in FIG. 2, for example. That is, these positions are selected to switch the power transmitting path to a power transmittable state by using the first clutch C1 and/or the second clutch C2.

More specifically, manually shifting the shift lever 49 from the "P" or "N" position into the "R" position applies the second clutch C2 such that the power transmitting path in the automatic shifting portion 20 changes from being interrupted (i.e., the power transmission-interrupted state) to being able to transmit power (i.e., the power transmittable state). Manually shifting the shift lever 49 from the "N" position into the "D" position applies at least the first clutch C1 such that the power transmitting path in the automatic shifting portion 20 changes from being interrupted to being able to transmit power. Also, manually shifting the shift lever 49 from the "R" position into the "P" or "N" position releases the second clutch C2 such that the power transmitting path in the automatic shifting portion 20 changes from being able to transmit power to being interrupted. Manually shifting the shift lever 49 from the "D" position into the "N" position releases both the first clutch C1 and the second clutch C2 such that the power transmitting path in the automatic shifting portion 20 changes from being able to transmit power to being interrupted.

Figure 6:
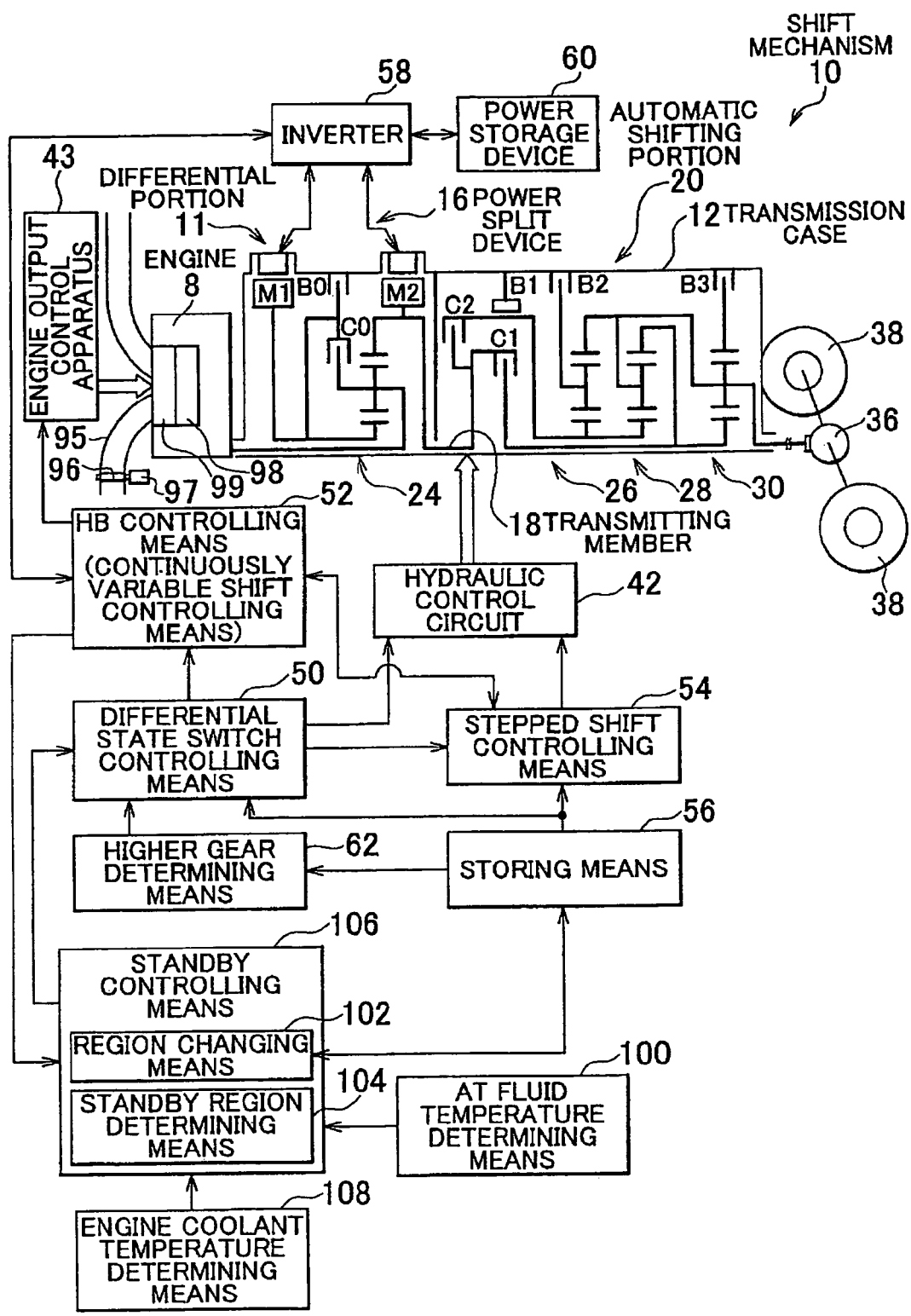
FIG. 6 is a functional block line diagram showing the main portions of control operations of the electronic control apparatus shown in FIG. 4.

FIG. 6 is a functional block line diagram showing the main portions of the functions controlled by the electronic control apparatus 40. In FIG. 6, stepped shift controlling means 54 functions as shift controlling means that executes shifting in the automatic shifting portion 20. For example, the stepped shift controlling means 54 determines whether a shift should be executed in the automatic shifting portion 20, i.e., determines the gear into which the automatic shifting portion 20 should be shifted into, based on the vehicle state as indicated by the vehicle speed V and the required output torque $T_{OUT}$ of the automatic shifting portion 20 from the relationship (i.e., shift line graph, shift map) shown by the solid lines and alternate long and short dashes lines in FIG. 7 that was stored in advance in storing means 56, and then executes a shift in the automatic shifting portion 20 to establish the gear that was determined. At this time, the stepped shift controlling means 54 outputs a command (i.e., a shift output command) to the hydraulic pressure control circuit 42 to apply and/or release the hydraulic friction apply devices, excluding the switching clutch C0 and the switching brake B0, to establish the gear according to the clutch and brake application chart shown in FIG. 2, for example.

Hybrid controlling means 52 operates the engine 8 in an efficient operating region when the shift mechanism 10 is in the continuously variable shift state, i.e., when the differential portion 11 is in the differential state, while changing both the distribution of driving force from the engine 8 and the second electric motor M2 and the reaction force from the power generated by the first electric motor M1 so that they are optimum and controlling the gear ratio γ0 of the differential portion 11 that functions as an electric continuously variable transmission. For example, the hybrid controlling means 52 calculates a target (i.e., required) output of the vehicle from the vehicle speed V and the accelerator depression amount $A_{CC}$ as the amount of output required by the driver at the vehicle speed at which the vehicle is running at that time. The hybrid controlling means 52 then calculates the necessary total target output from that target output of the vehicle and the charging required value, and calculates the target engine output taking into account transfer loss, loads from auxiliary devices, and the assist torque of the second motor electric M2 and the like to obtain that total target output. The hybrid controlling means 52 then controls the amount of power generated by the first electric motor M1 as well as controls the output of the engine 8 to obtain the engine speed $N_E$ and the engine torque $T_E$ that can achieve that target engine output.

The hybrid controlling means 52 executes that control taking into account the gear of the automatic shifting portion 20 to improve power performance and fuel efficiency and the like. With this kind of hybrid control, the differential portion 11 is made to function as an electric continuously variable transmission in order to match the engine speed $N_E$ that is set so that the engine 8 operates in an efficient operating region and the rotation speed of the transmitting member 18 that is set by the vehicle speed V and the gear of the automatic shifting portion 20. That is, the hybrid controlling means 52 controls the engine 8 so that it operates along the optimum fuel efficiency curve (fuel efficiency map, relationship) for the engine 8, not shown, which is obtained through testing and stored beforehand in order to achieve both drivability and fuel efficiency during continuously variable shift running in a two-dimension coordinate system having the engine speed $N_E$ and the output torque (i.e., the engine torque) $T_E$ of the engine 8, for example, as parameters. For example, the hybrid controlling means 52 determines the target value of the total gear ratio γT of the shift mechanism 10 to achieve the engine torque $T_E$ and engine speed $N_E$ for generating the necessary engine output to satisfy the target output (i.e., the total target output and the required driving force). The hybrid controlling means 52 then controls the gear ratio γ0 of the differential portion 11 to obtain that target value, and controls the total gear ratio γT within the range through which shifting is possible, such as a range from 13 to 0.5, for example.

At this time, the hybrid controlling means 52 supplies electric energy that was generated by the first electric motor M1 to the second electric motor M2 and the power storage device 60 via an inverter 58. Accordingly, most of the power from the engine is mechanically transmitted to the transmitting member 18. However, some of the power from the engine 8 is used (i.e., consumed) to generate power with the first electric motor M1 where it is converted into electric energy. This electric energy is then supplied via the inverter 58 to the second electric motor M2 where it is used to drive the second electric motor M2 in order to generate power which is then transmitted to the transmitting member 18. The equipment related to the process from the generation of this electric energy until that electric energy is consumed by the second electric motor M2 converts some of the power from the engine 8 into electric energy and provides an electrical path for that electric energy until that electric energy is converted into mechanical energy.

Also, the hybrid controlling means 52 is also functionally provided with engine output controlling means for executing output control of the engine 8 to generate the necessary engine output by outputting commands, either individually or in combination, to the engine output control apparatus 43 to control not only the electronic throttle valve 96 open and closed by the throttle actuator 97 for throttle control, but also the fuel injection quantity and fuel injection timing by the fuel injection apparatus 98 for fuel injection control, and the ignition timing by the ignition apparatus 99 such as an igniter for ignition timing control. For example, the hybrid controlling means 52 basically drives the throttle actuator 97 based on the accelerator depression amount $A_{CC}$ from a pre-stored relationship, not shown, and executes throttle control to increase the throttle opening amount $\theta_{TH}$ as the accelerator depression amount $A_{CC}$ increases.

Figure 7:
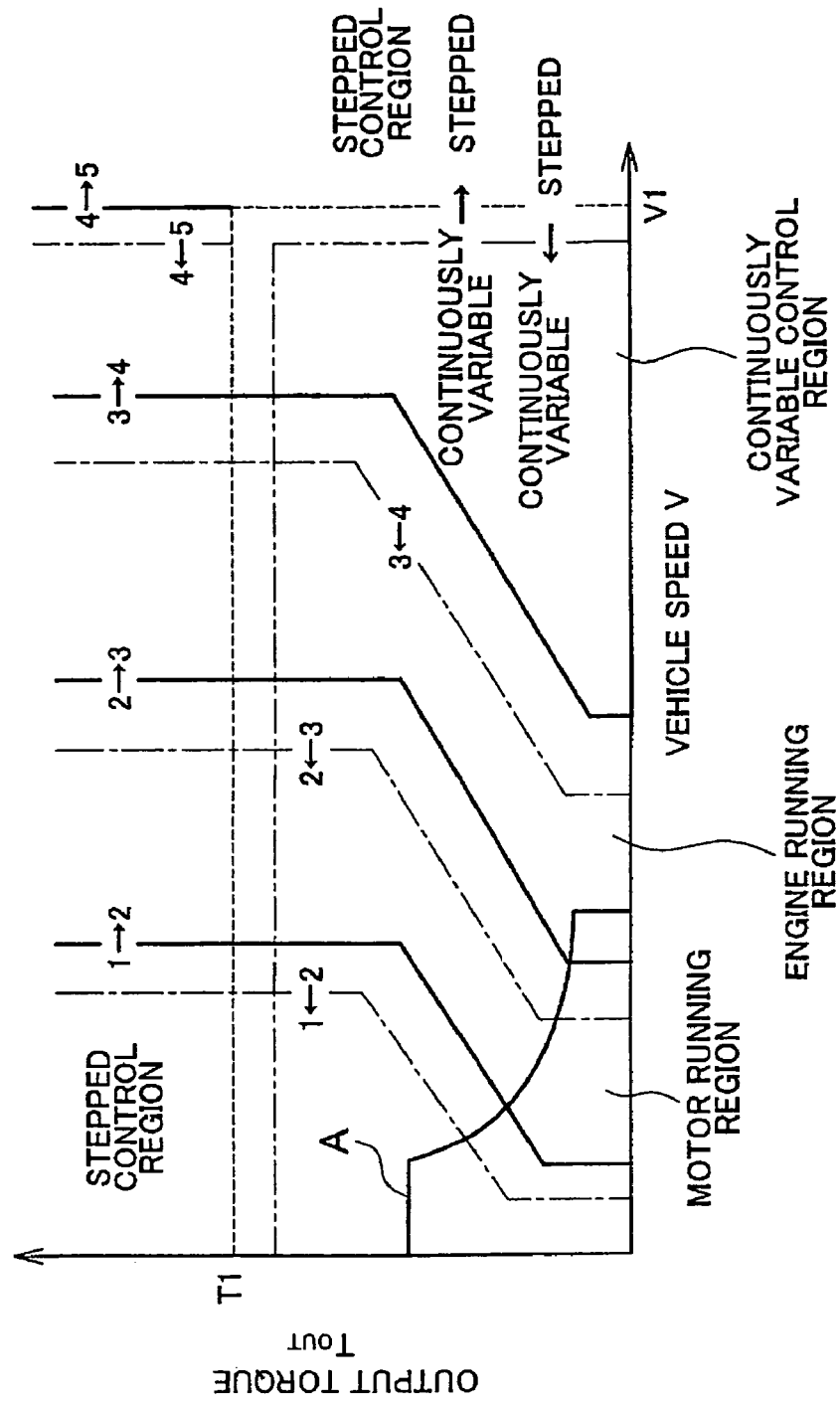
FIG. 7 is a view showing examples of a shift line graph which is stored in advance and used for making shift determinations in an automatic shifting portion, a switching line graph which is stored in advance and used for making switching determinations regarding the shift state of a shift mechanism, and a driving power source switching line graph with boundary lines for an engine running region and a motor running region, which is stored in advance and used for switching between engine running and motor running, all of the line graphs being formed on the same two-dimensional coordinate system with vehicle speed and output torque as parameters.

The solid line A in FIG. 7 is the boundary line between the engine running region and the motor running region for switching the driving power source for take-off/running (hereinafter simply referred to as "for running") of the vehicle between the engine 8 and a motor such as the second electric motor M2, i.e., for switching the vehicle between so-called engine running in which the vehicle is made to take-off/run (hereinafter simply referred to as "run") using the engine 8 as the driving power source for running, and so-called motor running in which the vehicle is driven using the second electric motor M2 as the driving power source for running. The pre-stored relationship with the boundary line (i.e., the solid line A) for switching between engine running and motor running shown in FIG. 7 is one example of a driving power source switching line graph (i.e., driving power source map) that is formed by a two-dimensional coordinate system having the vehicle speed V and the output torque $T_{OUT}$ which is a value related to driving power (i.e., driving force) as parameters. This driving power source switching line graph is stored in advance along with the shift line graph (i.e., shift map) shown by the solid lines and the alternate long and short dashes lines in FIG. 7, for example, in the storing means 56.

Then the hybrid controlling means 52 determines whether the vehicle is in the motor running region or the engine running region based on the vehicle state as indicated by the required output torque $T_{OUT}$ and the vehicle speed V from the driving power source switching line graph in FIG. 7, for example, and executes either motor running or engine running based on that determination. In this way, the motor running by the hybrid controlling means 52 is executed when the output torque $T_{OUT}$ is relatively low, i.e., when the engine torque $T_E$ is low, which is when engine efficiency is typically worse than it is in the high torque region, or when the vehicle speed V is relatively low, i.e., in the low load region, as is evident from FIG. 7.

During motor running, the hybrid controlling means 52 is also able to keep the engine speed $N_E$ at zero or substantially zero by controlling the first electric motor rotation speed $N_{M1}$ to a negative rotation speed, e.g., by rotating the first electric motor M1 idly, using the electric CVT function (differential operation) of the differential portion 11 in order to suppress drag from the stopped engine 8 and thus improve fuel efficiency.

Also, in the engine running region as well, so-called torque assist for adding to the power of the engine 8 is made possible by the hybrid controlling means 52 supplying electric energy from the first electric motor M1 and/or electric energy from the power storage apparatus 60 according to the electrical path described above to the second electric motor M2, and driving that second electric motor M2. Accordingly, engine running in this example embodiment also includes the combination of engine running and motor running (i.e., engine running+motor running).

Also, the hybrid controlling means 52 maintains the operating state of the engine 8 using the electric CVT function of the differential portion, regardless of whether the vehicle is stopped or running at low speeds. For example, when the vehicle is stopped and the state-of-charge (SOC) of the power storage device 60 is low such that electricity needs to be generated by the first electric motor M1, the first electric motor M1 is driven by the engine 8 so that it generates electricity. By increasing the rotation speed of that first electric motor M1, even if the second electric motor rotation speed $N_{M2}$ which is uniquely determined by the vehicle speed V becomes zero (or substantially zero) because the vehicle is stopped, the engine speed $N_E$ can be maintained at or above the speed that enables the engine 8 to operate under its own power, by using the differential operation of the power split device 16.

Also, the hybrid controlling means 52 keeps the engine speed $N_E$ at an appropriate speed by controlling the first electric motor rotation speed $N_{M1}$ and/or the second electric motor rotation speed $N_{M2}$ using the CVT function of the differential portion 11, regardless of whether the vehicle is stopped or running. For example, as is evident from the alignment graph in FIG. 3, when increasing the engine speed $N_E$, the hybrid controlling means 52 increases the electric motor rotation speed $N_{M1}$ while keeping the second electric motor rotation speed $N_{M2}$ that is restricted by the vehicle speed V substantially constant.

Higher gear determining means 62 determines whether the gear into which the shift mechanism 10 should be shifted is a higher gear, such as fifth gear, according to the shift line graph shown in FIG. 7 that was stored in advance in the storing means 56, based on the vehicle state, for example, in order to determine which, of the switching clutch C0 and the switching brake B0, to apply when placing the shift mechanism 10 in the stepped shift state.

Differential state switch controlling means 50 selectively switches the shift state between the continuously variable shift state, i.e., the differential state, and the stepped shift state, i.e., the locked state, by switching the state of the differential state switching device (C0, B0) between being applied and released based on the vehicle state. For example, the differential state switch controlling means 50 determines whether to switch the shift state of the shift mechanism 10 (i.e., the differential portion 11) based on the vehicle state as indicated by the required output shaft torque $T_{OUT}$ and the vehicle speed V from the relationship (switching line graph, switching map) shown by the broken line and the double-chain dash line in FIG. 7, which is stored in advance in the storing means 56. That is, the differential state switch controlling means 50 determines the shift state that the shift mechanism 10 should be in (i.e., switched to) by determining whether the vehicle state is in the continuously variable control region (i.e., differential region) in which the shift mechanism 10 should be placed in the continuously variable shift state, or in the stepped control region (i.e., the locked region) in which the shift mechanism 10 should be placed in the stepped shift state. Then the differential state switch controlling means 50 switches the shift state to selectively switch the shift mechanism 10 into either the continuously variable shift state (i.e., the differential state) or the stepped shift state (i.e., the locked state), depending on the determination.

More specifically, when the differential state switch controlling means 50 determines that the vehicle is in the stepped shift control region, it outputs a signal that does not allow, i.e., prohibits, hybrid control or continuously variable shift control to the hybrid controlling means 52. At the same time, the differential state switch controlling means 50 outputs a signal that allows a shift at the time of a stepped shift that was set in advance to the stepped shift controlling means 54. The stepped shift controlling means 54 at this time executes automatic shifting in the automatic shifting portion 20 according to the shift line graph shown in FIG. 7, for example, that was stored in advance in the storing means 56. For example, the clutch and brake application chart in FIG. 2 that was stored in advance in the storing means 56 shows the combinations of the hydraulic friction apply devices, i.e., C0, C1, C2, B0, B1, B2, and B3, that are selectively operated for the shift at this time. That is, the entire shift mechanism 10, i.e., the differential portion 11 and the automatic shifting portion 20, functions as a so-called stepped automatic transmission and establishes a gear according to the clutch and brake application chart shown in FIG. 2.

For example, when fifth gear is determined by the higher gear determining means 62, the differential state switch controlling means 50 outputs a command to the hydraulic control circuit 42 to release the switching clutch C0 and apply the switching brake B0 so that the differential portion 11 functions as an auxiliary transmission that has a fixed gear ratio γ0 such as 0.7 in order to establish a higher gear, i.e., a so-called overdrive gear, that has a gear ratio of less than 1.0 in the overall shift mechanism 10. Also, when the gear determined by the higher gear determining means 62 is not fifth gear, the differential state switch controlling mean 50 outputs a command to the hydraulic control circuit 42 to apply the switching clutch C0 and release the switching brake B0 so that the differential portion 11 functions as an auxiliary transmission that has a fixed gear ratio γ0 of 1, for example, in order to establish a lower gear having a gear ratio of 1.0 of higher in the overall shift mechanism 10. In this way, the differential state switch controlling means 50 switches the shift mechanism 10 to the stepped shift state and selectively switches the gear so that one of the two gears in that stepped shift state is established, thereby making the differential portion 11 function as an auxiliary transmission. The overall shift mechanism 10 can then be made to function as a so-called stepped automatic transmission by making the automatic shift portion 20 that is arranged in series with that differential portion 11 function as a stepped transmission.

However, when the differential state switch controlling means 50 determines that the vehicle state is in the continuously variable shift control region in which the shift mechanism 10 is to be switched to the continuously variable shift state, the differential state switch controlling means 50 outputs a command to the hydraulic control circuit 42 to release both the switching clutch C0 and the switching brake B0 so that the differential portion 11 is able to shift continuously in the continuously variable shift state in order to have the overall shift mechanism 10 be in a continuously variable shift state. At the same time, the differential state switch controlling means 50 also outputs a signal to the hybrid controlling means 52 to allow hybrid control, as well as outputs to the stepped shift controlling means 54 either a signal to fix (i.e., make constant) the gear during continuously variable shifting at a gear that was set in advance, or a signal to allow the automatic shifting portion 20 to shift automatically according to the shift line graph shown in FIG. 7, for example, which was stored in the storing means 56 in advance. In this case, the stepped shift controlling means 54 performs an automatic shift by an operation that excludes the application of the switching clutch C0 and the switching brake B0 in the clutch and brake application chart shown in FIG. 2. In this way, by having the differential portion 11 that was switched to the continuously variable shift state by the differential state switch controlling means 50 function as a continuously variable transmission and having the automatic shifting portion 20 that is arranged in series with that differential portion 11 function as a stepped transmission, the appropriate amount of driving force can be obtained while a continuous gear ratio width can be obtained for the gears by changing the rotation speed input to the automatic shifting portion 20, i.e., the rotation speed of the transmitting member 18, continuously (i.e., in a stepless manner) for first through fourth gears in the automatic shifting portion 20. Accordingly, the intervals between those gears are gear ratios that can be changed continuously (i.e., in a stepless manner) such that the overall shift mechanism 10 is in a continuously variable shift state so the total gear ratio γT can be obtained continuously.

Here, FIG. 7 is shows a relationship (shift line graph, shift map) which is stored in advance in the storing means 56 and provides the basis for the shift determinations of the automatic shifting portion 20. This shift line graph is formed by a two-dimensional coordinate system having the vehicle speed V and the required output torque $T_{OUT}$ which is a value related to the driving force as parameters. The solid lines in FIG. 7 are upshift lines and the alternate long and short dashes lines are downshift lines.

The broken line in FIG. 7 represents a determining vehicle speed V1 and a determining output torque T1 used by the differential state switch controlling means 50 to make a determination to switch between the continuously variable control region and the stepped control region. That is, the broke line in FIG. 7 includes both a high vehicle speed determination line and a high output running determination line. The high vehicle speed determination line defines a range of the determining vehicle speed V1 which is a high speed running determining value that is set in advance and used to determine high speed running of the hybrid vehicle. The high output running determination line defines a range of the determining output torque T1 which is a value related to the driving force of the hybrid vehicle, e.g., which is a high output running determining value that is set in advance and used to determine high output running in which the output torque $T_{OUT}$ of the automatic shifting portion 20 becomes high output. Moreover, there is hysteresis in the determination between the stepped control region and the continuously variable control region, as shown by the alternate long and two short dashes line with respect to the broken line in FIG. 7. That is, FIG. 7 is a switching line graph (i.e., switching map, relationship) which includes the determining vehicle speed V1 and the determining output torque T1 and has the vehicle speed V and the output torque $T_{OUT}$ as parameters, and which is stored in advance to help the differential state switch controlling means 50 determine whether the vehicle state is in the stepped control region or the continuously variable control region. Incidentally, this switching line graph may also be stored in advance in the storing means 56 as a shift map. Also, this switching line graph may include at least one of the determining vehicle speed V1 and the determining output torque T1, or may include a switching line that is stored in advance with either the vehicle speed V or the output torque $T_{OUT}$ as the parameter.

The shift line graph, the switching line graph, or the driving power source switching line graph or the like may be stored as a determination expression for comparing the actual vehicle speed V and the determining vehicle speed V1 or a determination expression for comparing the output torque $T_{OUT}$ and the determining output torque T1 instead of as a map. In this case, the differential state switch controlling means 50 places the shift mechanism 10 in a stepped shift state when the actual vehicle speed V (i.e., a value indicative of the vehicle state) has exceeded the determining vehicle speed V1. Also, the differential state switch controlling means 50 places the shift mechanism 10 in a stepped shift state when the output torque $T_{OUT}$ (i.e., another value indicative of the vehicle state) of the automatic shifting portion 20 has exceeded the determining output torque T1.

Also, if there is a failure or a decrease in function of an electrical control equipment such as an electric motor which makes the differential portion 11 operate as an electric continuously variable transmission, for example, when there is a decrease in function of equipment related to the electrical path from the generation of electrical energy in the first electric motor M1 until that electric energy is converted into mechanical energy, i.e., when there is failure in a transmission line or the like that connects the first electric motor M1, the second electric motor M2, the inverter 58, and the power storage device 60, or when the vehicle state results in a decrease in function due to a failure or low temperature, the differential state switch controlling means 50 may preferentially place the shift mechanism 10 in the stepped shift state in order to ensure vehicle running, even if the vehicle state is in the continuously variable control region.

The value related to the driving force described above is a parameter that corresponds one-to-one with the driving force of the vehicle. This value is not limited to the driving torque or driving force at the driving wheels 38, but may also be the actual value of, for example, the output torque $T_{OUT}$ of the automatic shifting portion 20, the vehicle acceleration, or the engine torque $T_E$ that is calculated based on the accelerator depression amount or the throttle valve opening amount $\theta_{TH}$ (or the intake air amount, the air-fuel ratio, and the fuel injection quantity) and the engine speed $N_E$, or an estimated value of, for example, the required driving force, the required (i.e., target) output torque $T_{OUT}$ of the automatic shifting portion 20, or the required (i.e., target) engine torque $T_E$ that is calculated based on the accelerator pedal depression amount by the driver or the throttle opening amount or the like. Also, the drive torque may be calculated taking into account the differential ratio and the radius of the driving wheels 38, and the like from the output torque $T_{OUT}$ and the like, or may be directly detected using a torque sensor or the like, for example. The same also applies to the other torques.

Also, the determining vehicle speed V1 is set, for example, so that the shift mechanism 10 is placed in the stepped shift state during high speed running in order to suppress a decrease in fuel efficiency which would occur if the shift mechanism 10 were in the continuously variable shift state during high speed running. Also, the determining torque T1 is set, for example, according to the characteristics of the first electric motor M1 in which the maximum output of electric energy from that first electric motor M1 can be reduced in order to reduce the size of the first electric motor M1 by not making it provide reaction torque all the way up to the high output region of the engine when the vehicle is running at high output.

Figure 8:
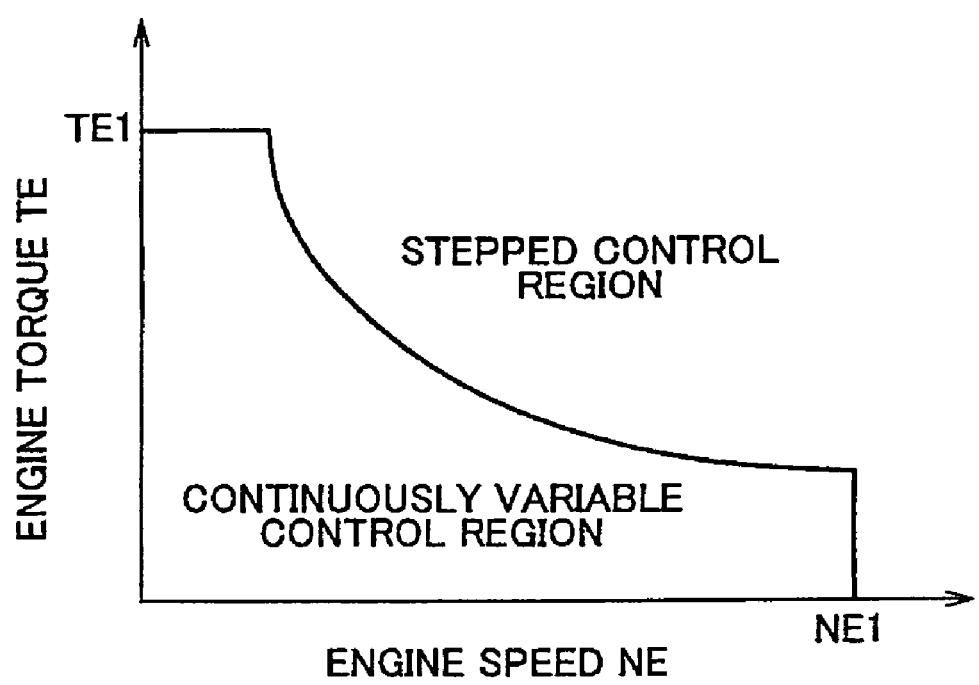
FIG. 8 is a graph showing a pre-stored relationship having a boundary line between a continuously variable control region and a stepped control region, and which is also a conceptual diagram for mapping out the boundary between a continuously variable control region and a stepped control region shown by the broken line in FIG. 7.

FIG. 8 is a switching line graph (switching map, relationship) that is stored in advance in the storing means 56, and which has an engine output line as a boundary line for determining whether the vehicle state is in the stepped control region (i.e., the locked region) or the continuously variable control region (i.e., the differential region) by the differential state switch controlling means 50, with engine speed $N_E$ and the engine torque $T_E$ as parameters. The differential state switch controlling means 50 may also determine, based on the engine speed $N_E$ and the engine torque $T_E$ from the switching line graph in FIG. 8 instead of the switching line graph in FIG. 7, whether the vehicle state as indicated by the engine speed $N_E$ and the engine torque $T_E$ is in the continuously variable control region (i.e., the differential region) or the stepped control region (i.e., the locked region). Also, FIG. 8 is also a schematic diagram for creating the broken line in FIG. 7. In other words, the broke line in FIG. 7 is also a switching line that has been repositioned on the two-dimensional coordinate system having the vehicle speed V and the output torque $T_{OUT}$ as parameters, based on the relationship diagram (i.e., map) in FIG. 8.

As shown in the relationship in FIG. 7, the high torque region in which the output torque $T_{OUT}$ is equal to or greater than the determining output torque T1 that was set in advance, or the high vehicle speed region in which the vehicle speed V is equal to or higher than the determining vehicle speed V1 that was set in advance, is set as the stepped control region. Therefore, stepped shift running is executed when the driving torque of the engine 8 is relatively high or when the vehicle speed is relatively high, and continuously variable shift running is executed when the driving torque of the engine 8 is relatively low or when the vehicle speed is relatively low, i.e., in the normal output region of the engine 8.

Similarly, as shown in FIG. 8, the high torque region in which the engine torque $T_E$ is equal to or greater than a predetermined value TE1 that was set in advance, a high speed region in which the engine speed $N_E$ is equal to or higher than a predetermined value NE1 that was set in advance, or a high output region in which the engine output calculated from the engine torque $T_E$ and the engine speed $N_E$ is equal to or greater than a predetermined output, is set as the stepped control region. Therefore, stepped shift running is executed when the torque of the engine 8 is relatively high, the speed of the engine 8 is relatively high, or the output of the engine 8 is relatively high, and continuously variable shift running is executed when the torque of the engine 8 is relatively low, the speed of the engine 8 is relatively low, or the output of the engine 8 is relatively low, i.e., in the normal output region of the engine 8. The boundary line between the stepped control region and the continuously variable control region in FIG. 8 corresponds to a high vehicle speed determining line that defines a high vehicle speed determining value range, and a high output running determining line that defines a high output running determining value range.

Accordingly, for example, when the vehicle is running at low or medium speeds and at low or medium output, the shift mechanism 10 is placed in a continuously variable shift state to ensure fuel efficiency performance of the vehicle. However, when the vehicle is running at high speeds, such as when the actual vehicle speed V is higher than the determining vehicle speed V1, the shift mechanism 10 is placed in the stepped shift state in which it operates as a stepped transmission and output from the engine 8 is transmitted to the driving wheels 38 entirely along a mechanical power transmitting path so conversion loss between power and electric energy that occurs when the shift mechanism 10 operates as an electric continuously variable transmission is suppressed so fuel efficiency is improved. Also, when the vehicle is running at high output such as when the value related to the driving force, such as the output torque $T_{OUT}$, exceeds the determining torque T1, the shift mechanism 10 is placed in the stepped shift state in which it operates as a stepped transmission and output from the engine 8 is transmitted to the driving wheels 38 entirely along a mechanical power transmitting path. Therefore, the region in which the shift mechanism 10 is made to operate as an electric continuously variable transmission is the region in which the vehicle is running at low or medium speed and at low or medium output such that the maximum value of the electric energy to be generated by the first electric motor M1, i.e., the maximum value of the electric energy that the first electric motor M1 transmits, can be reduced which enables the first electric motor M1 or the vehicle drive system that includes that first electric motor M1 to be further reduced in size. Also, from another perspective, during high output running, more emphasis is placed on the driving force demanded by the driver than on fuel efficiency so the shift state is switched from the continuously variable shift state to the stepped shift state (i.e., the fixed shift state).

In this way, the differential portion 11 (i.e., the shift mechanism 10) in this example embodiment can be selectively switched between the continuously variable shift state and the stepped shift state. The shift state into which the differential portion 11 should be switched is determined by the differential state switch controlling means 50 based on the vehicle state, and the differential state switch controlling means 50 selectively switches the differential portion 11 into either the continuously variable shift state (i.e., the differential state) or the stepped shift state (i.e., the locked state) depending on that determination. Here, if the actuation response of the differential state switching device (C0, B0) that is used to switch into the differential state or the non-differential state to the torque of the engine 8 that is input to the differential portion 11 is low, torque ends up being rapidly input to that differential state switching device (C0, B0) when it is applied. As a result, the durability of the differential state switching device (C0, B0) may decrease. Therefore, in this example embodiment, when the response of the differential state switching device (C0, B0) becomes low, a standby region is created near the boundary line between the stepped control region and the continuously variable control region on the switching line graph of FIG. 8. When the state of the engine 8 enters this standby region, standby control between the differential state and the locked state is executed to suppress the decrease in response of the differential state switching device (C0, B0). As a result, slipping caused by reduced response of the differential state switching device (C0, B0) is suppressed, such that a decrease in durability is also suppressed.

The AT fluid temperature determining means 100 determines whether the hydraulic fluid temperature of the automatic shift portion 20 is equal to or greater than a predetermined temperature $T_{EMP}1$. This AT fluid temperature determining means 100 is one specific example of determining means for determining whether there is decrease in response of the differential state switching device (C0, B0). If the hydraulic pressure temperature of the automatic shifting portion 20 drops, the viscosity of that hydraulic pressure increases so the operating speed, i.e., the response, of the differential state switching device (C0, B0) will decrease. Based on this, the AT fluid temperature determining means 100 determines whether there is a decrease in the response of the differential state switching device (C0, B0) from the drop in the hydraulic fluid temperature of the automatic shifting portion 20. Incidentally, the predetermined temperature $T_{EMP}1$ is empirically or theoretically set to an optimum value in advance, and this optimum value is stored in the storing means 56.

Figure 9:
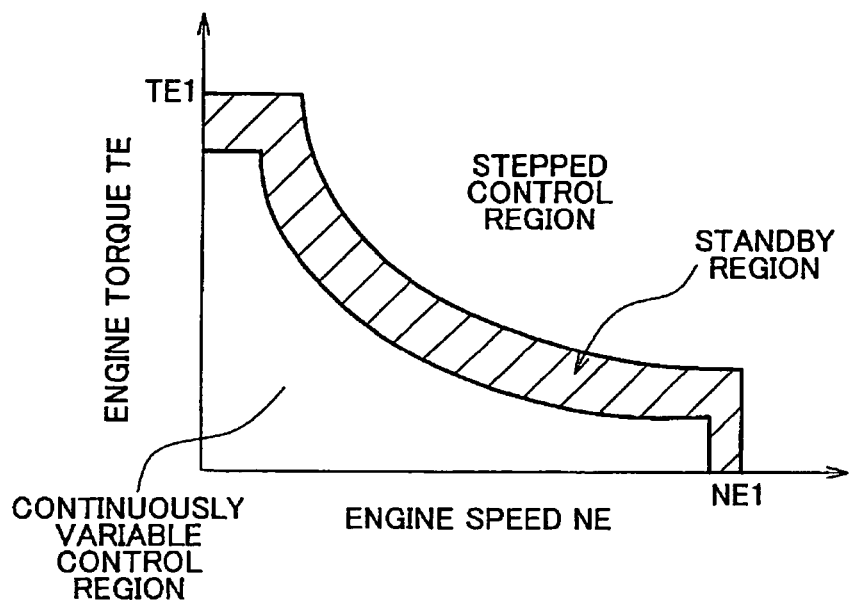
FIG. 9 is a graph showing a pre-stored relationship having a boundary line between the continuously variable control region and the stepped control region, and in particular, having a standby region near this boundary line.

Region changing means 102 switches the switching line graph based on the determination by the AT fluid temperature determining means 100. More specifically, if the AT fluid temperature determining means 100 determines that the hydraulic pressure temperature of the automatic shifting portion 20 is equal to or greater than the predetermined temperature $T_{EMP}1$, the region changing means 102 changes the region to the stepped control region or the continuously variable control region based on the regular switching line graph shown in FIG. 8. On the other hand, if the hydraulic fluid temperature of the automatic shifting portion 20 is less than the predetermined temperature $T_{EMP}1$, the switching line graph having the standby region shown in FIG. 9 is used instead. This standby region is created at the boundary between the stepped control region and the continuously variable control region. Also, the standby region is created on the continuously variable control side of the boundary line shown by the bold solid line which is the same as that in FIG. 8. That is, the standby region is created in the direction in which the area of the continuously variable control region becomes smaller. Incidentally, the switching line graph having this standby region in FIG. 9 is stored in the storing means 56 in advance.

Figure 10:
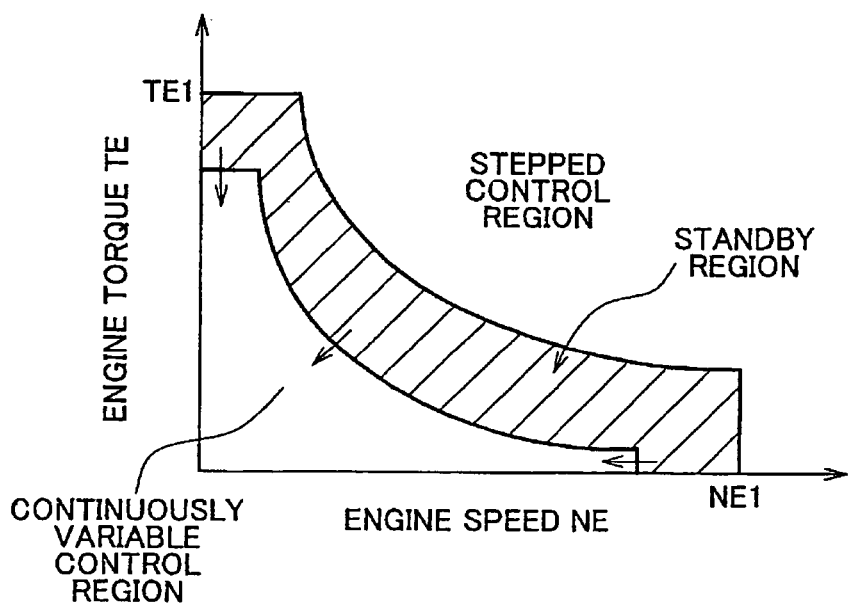
FIG. 10 is another graph showing a pre-stored relationship having a boundary line between the continuously variable control region and the stepped control region, and in particular, having the standby region near this boundary line.

Also, the region changing means 102 expands the standby region in the switching line graph to the differential region side according to the hydraulic fluid temperature of the automatic shifting portion 20, i.e., according to how low the response of the differential state switching device (C0, B0) is. More specifically, as shown in FIG. 10, for example, a plurality of switching line graphs with different standby regions that differ according to how low the hydraulic fluid temperature of the automatic shifting portion 20 is are prepared. For example, five switching line graphs are prepared in 10 degree increments for the hydraulic fluid temperature across a range from –10 degrees, which is relatively low, up to 40 degrees. These switching line graphs are set so that the standby region becomes larger, i.e., so that the area of the standby region increases, in the direction of the arrow as the hydraulic fluid temperature decreases. The switching line graph is switched according to the hydraulic fluid temperature of the automatic shifting portion 20, to the switching line graph that corresponds to that hydraulic fluid temperature.

Standby region determining means 104 determines whether the state of the engine 8 has moved to within the standby region based on the switching line graph selected by the region changing means 102. When the state of the engine 8 is outside of the standby region, the differential state switch controlling means 50 executes normal switching control. If, on the other hand, the state of the engine 8 has moved within the standby region, standby controlling means 106 executes standby control.

The standby controlling means 106 executes standby control based on the change by the region changing means 102 and the determination by the standby region determining means 104. This standby control is such that if the standby region determining means 104 determines that the state of the engine 8 has entered the standby region, the differential state switching device (C0, B0) is moved into a standby state, which is the state just before it starts apply, i.e., a so-called packed state in which there is no clearance between the discs or plates that apply by hydraulic pressure in the differential state switching device (C0, B0). More specifically, a pressure applying piston 200 that is moved by the hydraulic pressure of the hydraulic fluid in the differential state switching device (C0, B0) is moved into a state immediately before it presses against a friction plate 201. Accordingly, even if the temperature of the hydraulic fluid in the differential state switching device (C0, B0) is low, i.e., even if the response of the differential state switching device (C0, B0) is low, the differential state switching device (C0, B0) can immediately start to be applied when the torque $T_E$ of the engine 8 is increased such that the state of the engine 8 switches from the continuously variable control region to the stepped control region. As a result, the differential state switching device (C0, B0) is able to have the necessary torque capacity to handle the increase in torque $T_E$ of the engine 8 so slipping that occurs with the differential state switching device (C0, B0) can be suppressed, which inhibits the durability of the differential state switching device (C0, B0) from decreasing.

Here, the switch to the standby control may also be performed according to determining means other than the AT fluid temperature determining means 100. For example, the switch to standby control may also be performed based on the response to the input torque that is input to the differential portion 11. More specifically, in this example embodiment, the torque from the engine 8 is input to the differential portion 11 so the switch to standby control may be made based on the response to this input torque from the engine 8. Switching to standby control when the response of the input torque from the engine 8 decreases, i.e., switching to standby control when the response to the input torque from the engine 8 decreases to a predetermined value or lower, also makes it possible to quickly deal with input torque that is unstable due to decreased response of the engine 8, for example. The response to the input torque from the engine 8 is determined based on engine coolant temperature determining means 108 shown in FIG. 6, for example. Typically, the response to torque from the engine 8 tends to become lower as the engine coolant temperature decreases. Therefore, the response to the torque of the engine 8 can be indirectly determined by detecting the engine coolant temperature and switching to standby control when the detected engine coolant temperature is lower than a predetermined temperature.

Also, the standby controlling means 106 may also switch to the standby control based on the amount of change in the engine torque of the engine 8 that is input to the differential portion 11. More specifically, the amount of change per unit time in the torque that is output from the engine 8 is detected, and when that amount of change in the torque is greater than a predetermined amount of change in torque that is empirically or theoretically set in advance, the standby controlling means 106 may execute standby control. Accordingly, the differential state switching device (C0, B0) can be quickly applied even for sudden increases in engine torque by executing standby control, thus suppressing a decrease in the response of the differential state switching device (C0, B0).

Also, the standby controlling means 106 may also switch to the standby control based on the amount of change in the speed $N_E$ of the engine 8. More specifically, the amount of change per unit time in the speed $N_E$ of the engine 8 is detected, and when that amount of change in the speed is greater than a predetermined amount of change in speed that was empirically or theoretically set in advance, the standby controlling means 106 executes standby control. Accordingly, the differential state switching device (C0, B0) can be quickly applied even for sudden increases in engine torque by executing standby control, thus suppressing a decrease in the response of the differential state switching device (C0, B0).

Also, the standby controlling means 106 may switch to standby control based on the reaction torque of the first electric motor M1. The torque of the engine 8 can be indirectly estimated by detecting the reaction torque of the first electric motor M1. Accordingly, the switch to standby control in this case is essentially the same as the switch to the standby control based the torque of the engine that was described above. Incidentally, the size of the standby region may also be changed according to the parameters regardless of whether the switching determination is made based on the response to the engine torque, the amount of change in the engine torque, the amount of change in the engine speed $N_E$, or the reaction torque of the first electric motor M1. For example, the standby region may be expanded to the differential region side as the response to the input torque of the engine 8 becomes lower.

Also, the standby region may be expanded to the differential region side as the detected engine coolant temperature becomes lower.

Figure 11:
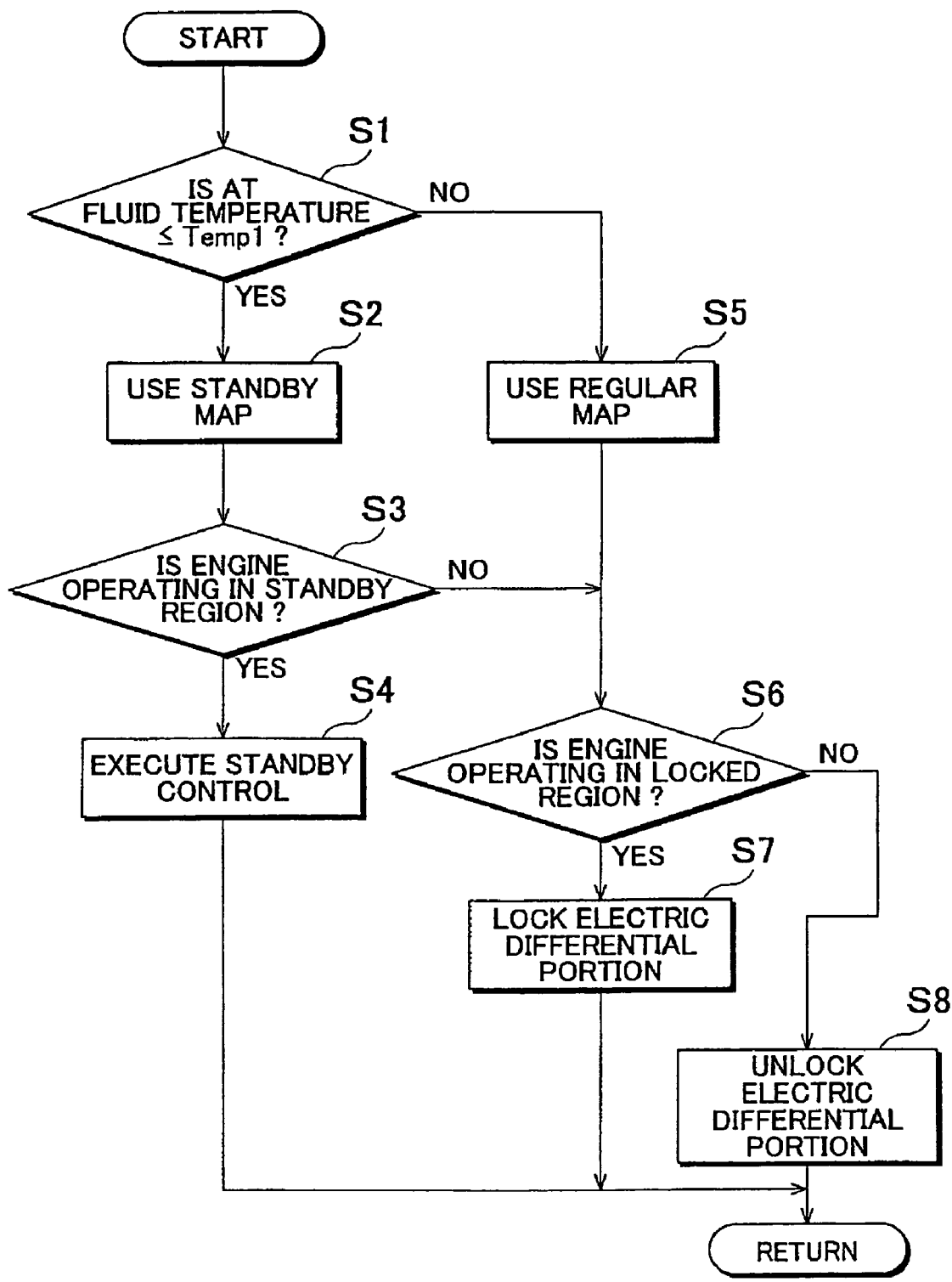
FIG. 11 is a flowchart illustrating a control operation of the electronic control apparatus shown in FIG. 4, i.e., a control operation for suppressing a decrease in the response of a hydraulic friction apply device when that response is low.

FIG. 11 is a flowchart illustrating the main portions of a control operation of the electronic control apparatus 40, i.e., a control operation for, when the response of the differential state switching device (C0, B0) has decreased, suppressing a decrease in the durability of the differential state switching device (C0, B0) by suppressing that decrease. The routine shown in this flowchart is repeatedly executed at extremely short cycle times of approximately several msec to several tens of msec, for example.

First in step S1 which is executed by the AT fluid temperature determining means 100, it is determined whether the hydraulic fluid temperature of the automatic shifting portion 20 is equal to or less than a predetermined hydraulic fluid temperature $T_{EMP}1$. That is, it is determined whether the response of the differential state switching device (C0, B0) is equal to or lower than a predetermined value. If the determination is no, then switching control is executed in step S5 based on the normal switching line graph shown in FIG. 8 in which there is no standby region. Then in step S6 it is determined whether the operating state of the engine 8 is in the locked region, i.e., the stepped control region. If the determination in step S6 is yes, either the switching clutch C0 or the switching brake B0 is applied in step S7, after which this cycle of the routine ends. If, on the other hand, the determination in step S6 is no, then it is determined that the operating state of the engine 8 is in the unlocked region, i.e., in the continuously variable control region, so in step S8 both the switching clutch C0 and the switching brake B0 are released, after which this cycle of the routine ends. Incidentally, in step S1 the determination as to whether to switch to standby control is made based on the hydraulic fluid temperature. However, the basis for this determination may also be something other than the hydraulic fluid temperature, for example the response to the torque of the engine 8, the amount of change per unit time in the engine torque, the amount of change per unit time in the speed $N_E$ of the engine 8, or the reaction torque of the first electric motor M1. Also, the determination as to whether to switch to standby control may also be made based on a combination of these.

If, on the other hand, the determination in step S1 is yes, then in step S2 which is executed by the region changing means 102, the switching line graph is switched to a switching line graph having a standby region. Incidentally, the switching line graph is switched to the switching line graph that corresponds to the hydraulic fluid temperature, from among the plurality of switching line graphs with different sized standby regions. Then in step S3 which is executed by the standby region determining means 104, it is determined whether the operating state of the engine 8 is in the standby region.

If the determination in step S3 is no, then it is determined in step S6 whether the operating state of the engine 8 is in the locked region, i.e., the stepped control region. If the determination in step S6 is yes, either the switching clutch C0 or the switching brake B0 is applied in step S7 and this cycle of the routine then ends. If, on the other hand, the determination in step S6 is no, then it is determined that the operating region of the engine 8 is the unlocked region, i.e., the continuously variable control region, so both the switching clutch C0 and the switching brake B0 are released in step S8 and this cycle of the routine then ends.

On the other hand, if the determination in step S3 is yes, then in step S4 which is executed by the standby controlling means 106, the standby control is executed, after which this cycle of the routine ends.

In this way, according to this example embodiment, the standby controlling means 106 is provided which controls the switch to the standby control based on a switching line graph that has a standby region between the differential region and the locked region, which places the differential state switching device (C0, B0) in a state just before it starts to apply. Therefore, when the differential state switching device (C0, B0) enters the standby region from the differential region, the differential state switching device (C0, B0) is placed in a state just before it starts to apply. Placing the differential state switching device (C0, B0) in a state just before it starts to apply in the standby region in this way enables the differential state switching device (C0, B0) to be quickly switched to a locked state. Accordingly, when the engine torque is increased, the differential state switching device (C0, B0) is quickly able to have the necessary torque capacity, which suppresses slipping that occurs at the differential state switching device (C0, B0) at that time. As a result, a decrease in the durability of the differential state switching device (C0, B0) can be suppressed.

Also, in the foregoing example embodiment, the switch to standby control may be made based on the response of the differential state switching device (C0, B0). Accordingly, when the response of the differential state switching device (C0, B0) decreases, for example, that decrease can be suppressed by executing standby control.

Also, according to the foregoing example embodiment, the region changing means 102 is provided which expands the standby region on the switching line graph toward the differential region side according to the response of the differential state switching device (C0, B0). Therefore, the standby region can be enlarged when the response of the differential state switching device (C0, B0) is relatively low, for example. As a result, the period of time for which the differential state switching device (C0, B0) is kept in the state just before it starts to apply can be increased so even when the response of the differential state switching device (C0, B0) is relatively low, a decrease in the response of the differential state switching device (C0, B0) can be suppressed.

Further, according to the foregoing example embodiment, the response of the differential state switching device (C0, B0) is determined based on the hydraulic fluid temperature of the automatic shifting portion 20. If the hydraulic fluid temperature of the automatic shifting portion 20 drops, the viscosity of the hydraulic fluid increases, and as a result, the response of the differential state switching device (C0, B0) that is operated by that hydraulic fluid deteriorates. Accordingly, the response of the differential state switching device (C0, B0) can be indirectly determined based on the hydraulic fluid temperature of the automatic shifting portion 20 and is therefore relatively easy to determine.

Also, according to the foregoing example embodiment, the standby controlling means 106 may switch to standby control based on the response to the input torque that is input to the differential portion 11. Accordingly, placing the differential state switching device (C0, B0) in the state just before it starts to apply when the response to the input torque that is input to the differential portion 11 decreases, for example, also makes it possible to deal with unstable input torque quickly.

Further, according to the foregoing example embodiment, the switch to standby control may be made based on the amount of change in the torque of the engine 8 that is input to the differential portion 11. Therefore, by placing the differential state switching device (C0, B0) in the state just before it starts to apply in the standby region, the differential state switching device (C0, B0) can quickly be placed in the locked state even when the engine torque increases suddenly, for example. As a result, a decrease in the durability of the differential state switching device (C0, B0) can be suppressed.

Moreover, according to the foregoing example embodiment, the engine torque can be indirectly estimated from the reaction torque of the first electric motor M1 so the control can be switched to the standby control based on the reaction torque of the first electric motor M1.

Also, according to the foregoing example embodiment, the switch to standby control may be made based on the amount of change in the speed $N_E$ of the engine 8. As a result, by placing the differential state switching device (C0, B0) in the state just before it starts to apply in the standby region, the differential state switching device (C0, B0) can quickly be placed in the locked state even when the speed $N_E$ of the engine 8 increases suddenly, for example. As a result, a decrease in the durability of the differential state switching device (C0, B0) can be suppressed.

Further, according to the foregoing example embodiment, when running at a high speed in which the actual vehicle speed exceeds a high speed running determining value, and/or when running at a high output in which a value related to the driving force, e.g., the required driving force or the actual driving force, exceeds a high output running determining value, output from the engine 8 is transmitted to the driving wheels 38 entirely along a mechanical power transmitting path so conversion loss between power and electric energy that occurs when the electric differential portion operates as a transmission in which the gear ratio is changed electrically is suppressed so fuel efficiency is improved Also, according to the foregoing example embodiment, the differential portion 11 and the automatic shifting portion 20 together make up a continuously variable transmission so the drive torque can be changed smoothly. Incidentally, the differential portion 11 is not only able to operate as an electric continuously variable transmission by continuously changing gear ratios, but also as a stepped transmission by changing gear ratios in a stepped manner, so drive torque can also be obtained quickly by changing the total gear ratio of the shift mechanism 10 in a stepped manner.

Moreover, according to the foregoing example embodiment, the differential portion 11 that is made to function as an electric continuously variable transmission and the stepped automatic shifting portion 20 together make up a continuously variable transmission. Accordingly, the drive torque can be changed smoothly. In addition, when the differential portion 11 is controlled so that its gear ratio is constant, a state is established by the differential portion 20 and the automatic shifting portion 20 that is similar to that of a stepped transmission so drive torque can also be quickly obtained by changing the total gear ratio of the shift mechanism 10 in a stepped manner.

While example embodiments of the invention have been described in detail with reference to the drawings, the invention is not limited to these example embodiments or constructions.

For example, in the foregoing example embodiment, the region changing means 102 changes the standby region according to the hydraulic fluid temperature of the automatic shifting portion 20, but instead of being changed gradually according to the hydraulic fluid temperature, standby control may also be executed according to a single switching line graph.

Also, in the foregoing example embodiment, the second electric motor M2 is directly connected to the transmitting member 18. However, the second electric motor M2 is not limited to being connected directly to the transmitting member 18. That is, the second electric motor M2 may instead be either directly connected to the power transmitting path between the differential portion 11 and the driving wheels 34, or indirectly connected to that power transmitting path via a transmission or the like.

Also, in the foregoing example embodiment, the differential portion 11 functions as an electric continuously variable transmission that continuously (i.e., in a stepped manner) changes the gear ratio $\gamma 0$ from the minimum value $\gamma 0 min$ to the maximum value $\gamma 0 max$. However, the invention may also be applied to a case in which the gear ratio $\gamma 0$ of the differential portion 11 is changed in a stepped manner, instead of continuously, using differential operation, for example.

Also, in the power split device 16 in the foregoing example embodiment, the first carrier CA1 is connected to the engine 8, the first sun gear S1 is connected to the first electric motor M1, and the first ring gear R1 is connected to the transmitting member 18. However, the connective relationships are not necessarily limited to these. For example, the engine 8, the first electric motor M1, and the transmitting member 18 may be connected to any of the three elements CA1, S1, and R1 of the first planetary gear set 24.

Also, in the foregoing example embodiment, the engine 8 is directly connected to the input shaft 14. However, as long as it is operatively linked via a gear or a belt or the like, it does not necessarily have to be arranged on the same axis as the input shaft 14.

Also, in the foregoing example embodiment, the first electric motor M1 and the second electric motor M2 are arranged concentric with the input shaft 14, with the first electric motor M1 being connected to the first sun gear S1 and the second electric motor M2 being connected to the transmitting member 18. However, the first electric motor M1 and the second electric motor M2 do not necessarily have to be arranged in this way. For example, the first electric motor M1 may be connected to the first sun gear S1 operatively via a gear, a belt, or reduction gears or the like, and the second motor M2 may be connected to the transmitting member 18 also operatively via a gear, a belt, or reduction gears or the like.

Also, in the foregoing example embodiment, the switching clutch C0 and the switching brake B0 may be apply devices such as electromagnetic clutches. With this structure as well, when the engine state is in the standby region, the engine can be placed in the standby state by controlling the electromagnetic clutches, so the invention can also be applied in this case as well. That is, the invention can also be applied even when a structure other than a hydraulic structure is used, as long as that structure is able to control the operation of the switching clutch C0 and the switching brake B0. Incidentally, when such a structure other than a hydraulic structure is used, another basis for determination other than the response to torque from the engine 8 or the like may be applied.

Also, in the foregoing example embodiment, the automatic shifting portion 20 is connected in series to the differential portion 11 via the transmitting member 18. Alternatively, however, a counter shaft may be provided parallel with the input shaft 14 and the automatic shifting portion 20 may be arranged concentric about that counter shaft. In this case, the differential portion 11 and the automatic shifting portion 20 may be connected so that power can be transmitted via a pair of transmitting members that include a counter gear set, a sprocket, and chain as the transmitting member 18, for example.

Also, the power split device 16, which serves as the differential mechanism in the foregoing example embodiment, may also be a differential gear unit in which a pinion that is rotatably driven by the engine and a pair of umbrella gears that are in mesh with that pinion are operatively linked to the first electric motor M1 and the transmitting member 18 (i.e., the second electric motor M2), for example.

Also, the power split device 16 in the foregoing example embodiment is made up of a single planetary gear set, but it may also be made up of two or more planetary gear sets such that when it is in a non-differential state (i.e., a fixed shift state) it functions as a transmission with three or more speeds (i.e., gears). Also, that planetary gear set is not limited to being a single pinion type planetary gear set. That is, it may also be a double pinion type planetary gear set. Further, when the power split device 16 is made up of two or more planetary gear sets in this way, the structure may be such that the engine 8, the first and second electric motors M1 and M2, the transmitting member 18, and depending on the structure, the output shaft 22, are connected to the rotating elements of these planetary gear sets so that power can be transmitted thereto, and furthermore, a switch between stepped shifting and continuously variable shifting can be made by controlling the clutches C and the brakes B that are connected to the rotating elements of the planetary gear sets.

In the foregoing example embodiment, the engine 8 and the differential portion 11 are directly connected together but they do not necessary have to be directly connected. That is, the engine 8 and the differential portion 11 may also be connected via a clutch Also, in the foregoing example embodiment, the differential portion 11 and the automatic shifting portion 20 are connected in series. However, the invention is not particularly limited to this structure. That is, the invention may be applied as long as the structure has both a function that makes the overall shift mechanism 10 perform an electric differential operation, and a function that makes the overall shift mechanism 10 perform a shift according to a different principle than the shift according to the electric differential operation There is no need to have these two functions mechanically independent Also, the arrangement thereof in terms of position and order is also not particularly limited.

Also, the shift operation executing device 48 in the foregoing example embodiment is provided with the shift lever 49 that is operated to select any one of a plurality of various shift positions $P_{SH}$. However, instead of the shift lever 49, for example, a switch such as a pushbutton switch or a sliding switch that can select any one of the plurality of various shift positions $P_{SH}$ may be provided, or a device that switches among the plurality of various shift positions $P_{SH}$ in response to the voice of the driver without relying on a manual operation may be provided, or a device that switches among the plurality of various shift positions $P_{SH}$ according to a foot operation may be provided. Also, in the foregoing example embodiment, the shift range is set by shifting the shift lever 49 into the "M" position. Alternatively, however, the gear may be set, i.e., the highest gear in each shift range may be set as the gear. In this case, the gear may be switched and a shift is executed in the automatic shifting portion 20. For example, when the shift lever 49 is manually operated into an upshift position "+" or a downshift position "−" of the "M" position, any gear from first gear to fourth gear may be set in the automatic shifting portion 20 according to the operation of the shift lever 49. Also, although in this specification the term "gear" (as in "first gear, "second gear" etc.) is used, it is to be understood that it does not necessarily refer to the presence of a physical gear. That is, the term "gear" simply refers to the state of an apparatus, such as a transmission, which yields a particular relation of torque and speed between a driving portion (i.e., input) and a driven portion (i.e., output), or which permits the driven portion to rotate in either the same direction as the driving portion (i.e., the forward rotation) or the opposite direction of the driving portion (i.e., reverse rotation). Accordingly, the term "gear" in this sense is interchangeable with the term "speed" (as in "five-speed transmission"). This concept also applies to the term "gear ratio" and thus the term "gear ratio" is interchangeable with the term "speed ratio".

Also, in the foregoing example embodiment, the standby map and the normal map are both used. However, when the response of the differential state switching device is good, the boundary line between the standby region and the continuously variable control region in FIG. 9 may be superposed on the boundary line between the stepped control region and the standby region. When the response of the differential state switching device is poor, the boundary line between the standby region and the continuously variable control region may be shifted toward the continuously variable control region to create the standby region.

While some embodiments of the invention have been illustrated above, it is to be understood that the invention is not restricted to details of the illustrated embodiments, but may be embodied with various changes, modifications or improvements, which may occur to those skilled in the art, without departing from the spirit and scope of the invention.

What is claimed is:

1. A vehicular drive system comprising:
   an engine;
   an electric differential portion in which a differential state of i) a rotation speed of an input shaft of the electric differential portion which is connected to the engine and ii) a rotation speed of an output shaft of the electric differential portion is controlled by controlling an operating state of an electric motor that is connected to a rotating element of a differential mechanism in a manner such that power can be transmitted to the differential mechanism;
   a differential state switching device formed of an apply element for selectively switching the differential mechanism between a differential state in which differential operation is possible and a locked state in which differential operation is not possible;
   a differential state switch controlling apparatus which switches the differential state based on a switching line graph which is set in advance according to a running state of the vehicle and demarcates a differential region in which the differential operation of the differential mechanism is possible and a locked region in which the differential operation of the differential mechanism is not possible; and
   a standby control apparatus which controls a switch to standby control between the differential state and the locked state based on a switching line graph that has a standby region between the differential region and the locked region, which places the differential state switching device in a state just before the differential state switching device starts to apply.

2. The vehicular drive system according to claim 1, wherein the standby control apparatus switches to standby control based on a response of the differential state switching device.

3. The vehicular drive system according to claim 2, wherein the standby control apparatus expands the standby region on the switching line graph toward the differential region side according to the response of the differential state switching device.

4. The vehicular drive system according to claim 3, wherein the standby control apparatus expands the standby region toward the differential region side as the response of the differential state switching device decreases.

5. The vehicular drive system according to claim 2, further comprising:
 a shifting portion provided in a power transmitting path that extends from the electric differential portion to a driving wheel,
 wherein the response of the differential state switching device is determined based on a hydraulic fluid temperature of the shifting portion.

6. The vehicular drive system according to claim 5, wherein the standby control apparatus expands the standby region toward the differential region side as the hydraulic fluid temperature of the shifting portion decreases.

7. The vehicular drive system according to claim 1, wherein the standby control apparatus switches to standby control based on the response to input torque that is input to the electric differential portion.

8. The vehicular drive system according to claim 1, further comprising:
 a detector that detects a coolant temperature of the engine,
 wherein the standby control apparatus expands the standby region toward the differential region side as the detected coolant temperature of the engine decreases.

9. The vehicular drive system according to claim 1, further comprising:
 a detector that detects a coolant temperature of the engine,
 wherein the standby control apparatus expands the standby region toward the differential region side when the detected coolant temperature of the engine is less than a predetermined value.

10. The vehicular drive system according to claim 1, wherein the standby control apparatus switches to standby control based on an amount of change in the torque of the engine that is input to the electric differential portion.

11. The vehicular drive system according to claim 10, wherein the standby control apparatus switches to standby control when the amount of change in the torque is greater than a predetermined amount of change in torque.

12. The vehicular drive system according to claim 1, wherein the standby control apparatus switches to standby control based on reaction torque of the electric motor.

13. The vehicular drive system according to claim 1, wherein the standby control apparatus switches to standby control based on an amount of change in speed of the engine.

14. The vehicular drive system according to claim 13, wherein the standby control apparatus switches to standby control when the amount of change in the speed is greater than a predetermined amount of change in speed.

15. The vehicular drive system according to claim 1, wherein the differential state switching apparatus switches the differential mechanism to a locked state when the vehicle is running at a high speed such as a vehicle speed that exceeds a high speed running determining value, which is set in advance, for determining when the vehicle is running at a high speed, and/or when the vehicle is running at a high output such as an output that exceeds a high output running determining value, which is set in advance, for determining when the vehicle is running at a high output.

16. The vehicular drive system according to claim 1, wherein the electric differential portion operates as a continuously variable transmission by the operating state of the electric motor being controlled.

17. The vehicular drive system according to claim 5, wherein the shifting portion is a stepped automatic transmission.

18. A vehicular drive system according to claim 1, wherein in the standby control apparatus moves a pressure applying piston, which is moved by hydraulic pressure of hydraulic fluid of the differential state switching device, into a state right before the pressure applying piston pushes against a friction plate.

19. A vehicular drive system comprising:
 an engine;
 an electric differential portion in which a differential state of i) a rotation speed of an input shaft of the electric differential portion that is connected to the engine and ii) a rotation speed of an output shaft of the electric differential portion is controlled by controlling an operating state of an electric motor that is connected to a rotating element of a differential mechanism in a manner such that power can be transmitted to the differential mechanism;
 a differential state switching device formed of an apply element for selectively switching the differential mechanism between a differential state in which differential operation is possible and a locked state in which differential operation is not possible; and
 a controller which controls the differential state switching device based on a switching line graph which is set in advance according to a running state of the vehicle and has i) a differential region in which the differential operation of the differential mechanism is possible, ii) a locked region in which the differential operation of the differential mechanism is not possible, iii) and a standby region which is between the differential region and the locked region and which places the differential state switching device in a state just before the differential state switching device starts to apply.

20. A vehicular drive system comprising:
 an engine;
 an electric differential portion in which a differential state of i) a rotation speed of an input shaft of the electric differential portion that is connected to the engine and ii) a rotation speed of an output shaft of the electric differential portion is controlled by controlling an operating state of an electric motor that is connected to a rotating element of a differential mechanism in a manner such that power can be transmitted to the differential mechanism;
 differential state switching means formed of an apply element for selectively switching the differential mechanism between a differential state in which differential operation is possible and a locked state in which differential operation is not possible; and
 controlling means for controlling the differential state switching means based on a switching line graph which is set in advance according to a running state of the vehicle and has i) a differential region in which the differential operation of the differential mechanism is possible, ii) a locked region in which the differential operation of the differential mechanism is not possible, iii) and a standby region which is between the differential region and the locked region and which places the differential state switching means in a state just before the differential state switching means starts to apply.

21. A control method for a vehicular drive system, comprising:

determining a running state of the vehicle; and placing a differential state switching device, which switches between i) a differential state in which differential operation is possible between a rotation speed of an input shaft of a differential mechanism that is provided between an engine and a transmission, the input shaft being connected to the engine, and a rotation speed of an output shaft of the differential mechanism, and ii) a non-differential state in which differential operation is not possible between the rotation speed of the input shaft and the rotation speed of the output shaft, by controlling an operating state of an electric motor that is connected to a rotating element of the differential mechanism in a manner such that power can be transmitted to that rotating element, in a state immediately preceding the differential state based on the determined running state of the vehicle.

22. The control method according to claim 21, wherein the differential state switching device is controlled based on a first switching line graph which is set in advance according to a running state of the vehicle and has i) a differential region in which the differential operation of the differential mechanism is possible, ii) a locked region in which the differential operation of the differential mechanism is not possible, iii) and a standby region which is between the differential region and the locked region and which places the differential state switching device in a state just before the differential state switching device starts to apply.

23. The control method according to claim 22, further comprising:

determining whether to control the differential state switching device using the first switching line graph, and wherein the differential state switching device is controlled based on a second switching line graph which was set in advance according to the running state of the vehicle and demarcates a differential region in which the differential operation of the differential mechanism is possible and a locked region in which the differential operation of the differential mechanism is not possible, when it is determined that the differential state switching device should not be controlled using the first switching line graph.

24. The control method according to claim 23, wherein it is determined that the differential state switching device should be controlled using the first switching line graph when a response of the differential state switching device is less than a predetermined value.

25. The control method according to claim 21, wherein the running state of the vehicle is determined based on vehicle speed and required output torque.

* * * * *